US012612074B2

(12) United States Patent
Ishimaru et al.

(10) Patent No.: US 12,612,074 B2
(45) Date of Patent: Apr. 28, 2026

(54) VEHICLE CONTROL DEVICE, VEHICLE CONTROL METHOD, AND AUTOMATIC DRIVING METHOD

(71) Applicant: DENSO CORPORATION, Kariya-city (JP)

(72) Inventors: Kazuhisa Ishimaru, Nisshin (JP); Atsushi Baba, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 455 days.

(21) Appl. No.: 17/658,072

(22) Filed: Apr. 5, 2022

(65) Prior Publication Data

US 2022/0227392 A1    Jul. 21, 2022

Related U.S. Application Data

(63) Continuation of application No. PCT/JP2020/028591, filed on Jul. 23, 2020.

(30) Foreign Application Priority Data

Oct. 9, 2019    (JP) ................................. 2019-186270

(51) Int. Cl.
B60W 60/00      (2020.01)
B60W 10/20      (2006.01)
B60W 30/09      (2012.01)
B60W 30/095     (2012.01)
B60W 30/14      (2006.01)
B60W 40/04      (2006.01)
G06N 3/08       (2023.01)

(52) U.S. Cl.
CPC ........ B60W 60/0011 (2020.02); B60W 10/20 (2013.01); B60W 30/09 (2013.01); B60W 30/0956 (2013.01); B60W 30/143 (2013.01); B60W 40/04 (2013.01); B60W 60/00274 (2020.02); G06N 3/08 (2013.01); B60W 2554/4046 (2020.02); B60W 2554/80 (2020.02)

(58) Field of Classification Search
CPC ................... B60W 60/0011; B60W 60/00274
See application file for complete search history.

(56) References Cited

U.S. PATENT DOCUMENTS

2005/0206236 A1    9/2005  Mori et al.
2015/0120688 A1    4/2015  Shionoiri et al.
(Continued)

FOREIGN PATENT DOCUMENTS

JP      2000-142321 A     5/2000
JP      2012-104029 A     5/2012
(Continued)

*Primary Examiner* — Imran K Mustafa
(74) *Attorney, Agent, or Firm* — Precision Patents, P.C.

(57)    ABSTRACT

In a vehicle control device, environmental information is acquired which is information about an environment in which a vehicle is placed. The environmental information precludes an obstacle around the vehicle. A possibility is estimated for potential proximity of the vehicle to the obstacle. A behavior of a predicted target moving object including the vehicle and at least one moving object around the vehicle is predicted based on the estimated possibility. A responsibility is determined for a potential accident that is assumed in response to the vehicle traveling on a candidate route that the vehicle travels.

15 Claims, 8 Drawing Sheets

(56)     References Cited

U.S. PATENT DOCUMENTS

| | | | |
|---|---|---|---|
| 2015/0210279 | A1 | 7/2015 | Agnew et al. |
| 2017/0158175 | A1* | 6/2017 | Fairfield .............. G05D 1/0088 |
| 2017/0248949 | A1* | 8/2017 | Moran ................... G08G 1/165 |
| 2017/0259816 | A1 | 9/2017 | Takeda |
| 2017/0316049 | A1 | 11/2017 | Shionoiri et al. |
| 2018/0345957 | A1 | 12/2018 | Ohmura |
| 2019/0039545 | A1* | 2/2019 | Kumar ................... G07C 5/008 |
| 2019/0079527 | A1* | 3/2019 | Censi ................... G06F 40/216 |
| 2019/0283763 | A1 | 9/2019 | Wang |
| 2021/0094577 | A1* | 4/2021 | Shalev-Shwartz ........................... B60W 60/001 |

FOREIGN PATENT DOCUMENTS

| | | | |
|---|---|---|---|
| JP | 2012-221353 | A | 11/2012 |
| JP | 2013-173416 | A | 9/2013 |
| JP | 2015-097071 | A | 5/2015 |
| JP | 2016-139204 | A | 8/2016 |
| WO | 2018/115963 | A2 | 6/2018 |

* cited by examiner

VEHICLE CONTROL DEVICE, VEHICLE CONTROL METHOD, AND AUTOMATIC DRIVING METHOD

CROSS REFERENCE TO RELATED APPLICATIONS

The present application is a continuation application of International Patent Application No. PCT/JP2020/028591 filed on Jul. 23, 2020, which designated the U.S. and claims the benefit of priority from Japanese Patent Application No. 2019-186270 filed on Oct. 9, 2019. The entire disclosures of all of the above applications are incorporated herein by reference.

TECHNICAL FIELD

The present disclosure relates to a vehicle control device, a vehicle control method, and an automatic driving method.

BACKGROUND

There is known an automatic driving that automates the driving operation of a vehicle. It is also considered to use a mathematical formula model that formulates the concept of safe driving for automatic driving.

For example, there is described a technology that maintains a safety distance at a minimum with an obstacle such a pedestrian. The safety distance is a distance as a criterion for evaluating safety, which is calculated by a mathematical formula model called an RSS (Responsibility Sensitive Safety) model in automatic driving. The above safety distance is determined based on information on behavior such as vehicle speed, maximum deceleration, and maximum acceleration.

SUMMARY

According to an example of the present disclosure, a vehicle control device is provided as follows. In the vehicle control device, environmental information is acquired which is information about an environment in which a vehicle is placed. The environmental information precludes an obstacle around the vehicle. A possibility is estimated for potential proximity of the vehicle to the obstacle. A behavior of a predicted target moving object including the vehicle and at least one moving object around the vehicle is predicted based on the estimated possibility. A responsibility is determined for a potential accident that is assumed in response to the vehicle traveling a candidate route that the vehicle travels.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Figure 1:
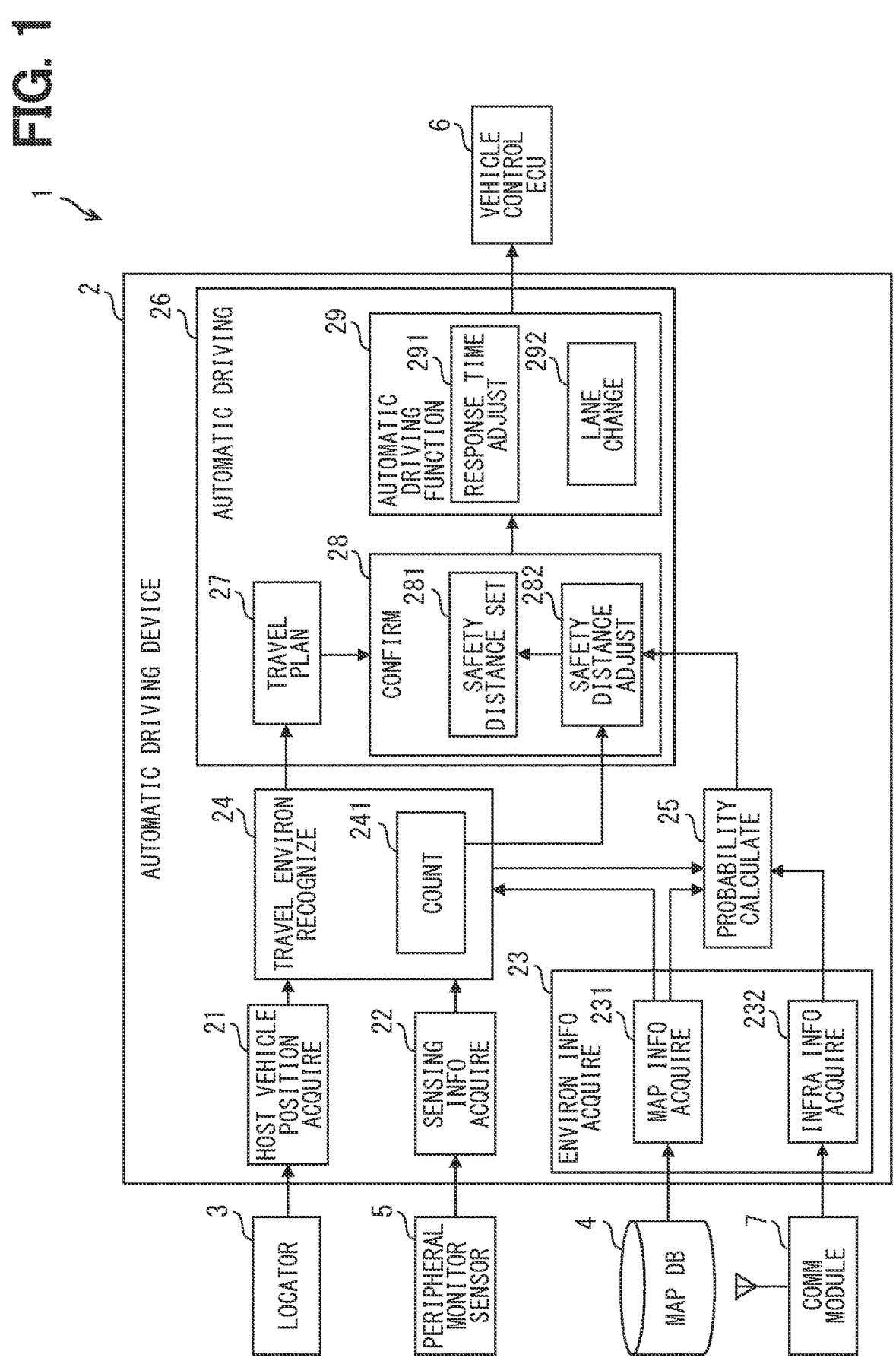
FIG. 1 is a schematic configuration diagram of a vehicle system and an automatic driving device.

Embodiments for disclosure will be described with reference to the drawings. For convenience of description, the parts having the same functions as the parts shown in the drawings used in the description up to that point in several embodiments may be designated by the same reference signs and the description thereof may be omitted. Description in another applicable embodiment may be referred to for such a part denoted by the identical reference sign.

First Embodiment

<Schematic Configuration of Vehicle System 1>

The following will describe a first embodiment of the present disclosure with reference to the accompanying drawings. A vehicle system 1 shown in FIG. 1 is used in a vehicle capable of automatic driving (hereinafter referred to as an automatic driving vehicle). As shown in FIG. 1, the vehicle system 1 includes an automatic driving device 2, a locator 3, a map database (hereinafter, map DB) 4, a peripheral monitoring sensor 5, a vehicle control ECU (Electronic Control Unit) 6, and a communication module 7. Although the vehicle using the vehicle system 1 is not necessarily limited to an automobile, hereinafter, an example using the automobile will be described.

The automatic driving vehicle in the first embodiment may be any vehicle capable of automatic driving as described above. The degree of the automatic driving (hereinafter, referred to as an automation level) includes multiple levels as defined by SAE, for example. The automation level is classified into levels Lv 0 to 5 as follows, for example, in the definition of SAE.

Level Lv0 is a level at which the driver performs all driving tasks without any intervention of the system. The driving tasks include, for example, a steering control, an acceleration, and a deceleration. Level Lv0 corresponds to so-called manual driving. Level Lv1 is a level at which the system assists either (i) steering or (ii) acceleration/deceleration. Level Lv2 is a level at which the system assists both (i) steering and (ii) acceleration/deceleration. Levels Lv1 and Lv2 correspond to so-called driving assistance level.

Level Lv3 is a level at which the system performs all driving tasks in certain locations, such as highways, and the driver drives the vehicle in an emergency. In the level Lv3, the driver is required to be able to respond quickly when the system requests a driver change. The level 3 corresponds to so-called conditional automatic driving. Level Lv4 is a level at which the system is capable of performing all driving tasks, except under specific circumstances such as unsupported roads, extreme environments, etc. The level Lv4 corresponds to so-called highly automatic driving. Level Lv5 is a level at which the system is capable of performing all driving tasks in any situation. The level Lv5 corresponds to so-called fully automatic driving. The levels Lv3 to Lv5 correspond to so-called automatic driving.

The automatic driving vehicle according to the first embodiment may be, for example, an automatic driving vehicle having an automation level Lv3 or an automatic driving vehicle having an automation level Lv4 or higher. The automation level may be switchable. For example, the host vehicle may be configured to switch the automation levels between (i) the automatic driving at level Lv3 or higher and (ii) the manual driving at level Lv0. Hereinafter, a case where the automatic driving vehicle performs automatic driving at least with an automation level Lv3 or higher will be described as an example.

The locator 3 includes a GNSS (Global Navigation Satellite System) receiver and inertial sensors. The GNSS receiver receives positioning signals from a plurality of positioning satellites. The inertial sensors include, for example, a gyro sensor and an acceleration sensor. The locator 3 combines the positioning signals received by the GNSS receiver with the measurement results of the inertial sensors to sequentially measure the vehicle position of the host vehicle on which the locator 3 is mounted. The vehicle position may be represented by, for example, the coordinates of latitude and longitude. The vehicle position may be measured using a travel distance obtained from signals sequentially output from a vehicle speed sensor mounted on the host vehicle.

The map DB 4 is a nonvolatile memory, and stores map data such as link data, node data, road shape, structures and the like. The map data may include a three-dimensional map including feature points of road shapes and buildings. When the three-dimensional map including the feature points of the road shapes and buildings is used as the map data, the locator 3 may be configured to identify the host vehicle position using the detection results of (i) a LIDAR (Light Detection and Ranging/Laser Imaging Detection and Ranging) configured to detect the feature points of the road shapes and the buildings or (ii) the peripheral monitoring sensor 5 such as a periphery monitoring camera. The three-dimensional map may be generated by REM (Road Experience Management) based on captured images.

The peripheral monitoring sensor 5 is an autonomous sensor that monitors the peripheral environment of the host vehicle. As one example, the peripheral monitoring sensor 5 is used for detecting moving objects such as pedestrians, animals other than human, and vehicles other than the host vehicle, and static objects such as guardrails, curbs, and trees. The peripheral monitoring sensor 5 also detects road surface markings such as traffic lane markings around the host vehicle. For example, the peripheral monitoring sensor 5 is a peripheral monitor camera that captures a predetermined range around the host vehicle, and a distance measurement sensor that transmits a scanning wave to a predetermined range around the host vehicle such as a millimeter wave radar, a sonar, or a LIDAR. The moving object is an object that can move autonomously, and is not necessarily limited to a moving state, but may include a stationary state.

The vehicle control ECU 6 is an electronic control device (that is, a travel control device) that controls the travel of the host vehicle. The travel control includes acceleration/deceleration control and/or steering control. The vehicle control ECU 6 includes (i) a steering ECU that performs steering control and (ii) a power unit control ECU and a brake ECU that perform acceleration/deceleration control. The vehicle control ECU 6 is configured to perform the travel control by outputting control signals to the travel control devices such as an electronic throttle, a brake actuator, and an EPS (Electric Power Steering) motor.

The communication module 7 transmits/receives information to/from a center outside the host vehicle via a public communication network. As an example, the communication module 7 downloads infrastructure information such as weather information, event information, and facility usage information from the center.

The weather information is information such as the weather and temperature for each predetermined division unit. The division unit may be a mesh unit of a map, an administrative division unit, or another division unit. Event information is information about holding an event such as a concert where people gather. The event information may be configured to include the location of the event venue, the date of the event, the time zone of the event, and the like. Facility usage information is information about the use of facilities such as schools and train stations where people gather. The facility usage information may be configured to include the day of the week used, the time zone used, and the like. If the facility is a school, it may be used from the time of attending school to the time of leaving school. If the facility is a station, the average number of users by time zone may be included in the facility usage information.

The communication module 7 may be configured to receive the above-mentioned infrastructure information transmitted from the roadside unit installed on the roadside by road-to-vehicle communication. The communication module 7 may receive the map data distributed from the external server that distributes the map data, and store it in the map DB 4.

The automatic driving device 2, which may also be referred to as an automatic driving controller 2, includes, for example, a processor, a memory, an I/O, and a bus that connects those devices, and executes various processes related to the automatic driving by executing a control program stored in the memory. The memory referred to here is a non-transitory tangible storage medium that stores programs and data that can be read by a computer. Further, the non-transitory tangible storage medium is realized by a semiconductor memory, a magnetic disk, or the like. The details of the automatic driving device 2 will be described below.

<Schematic Configuration of Automatic Driving Device 2>

Subsequently, the schematic configuration of the automatic driving device 2 will be described with reference to FIG. 1. As shown in FIG. 1, the automatic driving device 2 includes functional blocks such as a host vehicle position acquisition unit 21, a sensing information acquisition unit 22, an environmental information acquisition unit 23, a travel environment recognition unit 24, a probability calculation unit 25, and an automatic driving unit 26. It should be noted that a part or all of the functions executed by the automatic driving device 2 may be configured in terms of hardware by one or a plurality of ICs or the like. Further, a part or all of the functional blocks included in the automatic driving device 2 may be realized by a combination of software execution by a processor and hardware members.

The host vehicle position acquisition unit 21 acquires the vehicle position of the host vehicle to be sequentially positioned by the locator 3. The sensing information acquisition unit 22 acquires the detection result (that is, sensing information) sequentially detected by the peripheral monitoring sensor 5. The environmental information acquisition unit 23 acquires information on the environment in which the vehicle is placed (hereinafter referred to as environmental information) other than obstacles around the vehicle. The environmental information includes information on non-obstacles around the vehicle and information on the frequency with which moving objects appear on the road. Further, the information on obstacle around the host vehicle, which is excluded from the environmental information, signifies the information obtained by detecting the obstacles around the host vehicle by the sensor provided in the host vehicle. The environmental information itself contains information about the frequency with which the moving object appears on the road, in other words, the possibility that the position of the moving object changes from a non-road to a road over time. On the other hand, as can be seen from the above specific example, the change in the content due to the difference in the acquisition timing of the environmental information is much smaller than the time change in the position of the moving object. It can be said that the environmental information is static information when compared with the time change of the position of the moving object.

The environmental information acquisition unit 23 includes a map information acquisition unit 231 and an infrastructure information acquisition unit 232 as sub-functional blocks. The map information acquisition unit 231 acquires the map data stored in the map DB 4. The map data acquired by the map information acquisition unit 231 may include, for example, the coordinates of facilities such as schools and stations where people gather, the vertical gradient of roads, the curvature of curves, and the like. The map data acquired by the map information acquisition unit 231 corresponds to the above-mentioned environmental information. The map information acquisition unit 231 may acquire map data around the host vehicle according to the vehicle position of the host vehicle acquired by the host vehicle position acquisition unit 21. It is preferable that the map information acquisition unit 231 acquires map data for a range wider than the detection range of the peripheral monitoring sensor 5.

The infrastructure information acquisition unit 232 acquires the infrastructure information received from the center by the communication module 7. Examples of infrastructure information include the above-mentioned weather information, event information, facility usage information, and the like. The infrastructure information acquired by the infrastructure information acquisition unit 232 corresponds to the above-mentioned environmental information.

The travel environment recognition unit 24 recognizes the travel environment around the host vehicle from the vehicle position of the host vehicle acquired by the host vehicle position acquisition unit 21, the map data acquired by the map information acquisition unit 231, and the sensing information acquired by the sensing information acquisition unit 22. As an example, the travel environment recognition unit 24 recognizes the position, shape, and moving state of the peripheral objects of the host vehicle by using the above information, and generates a virtual space that reproduces the actual travel environment. From the sensing information acquired by the sensing information acquisition unit 22, the travel environment recognition unit 24 may recognize the distance to the peripheral object of the host vehicle, the relative speed of the peripheral object to the host vehicle, and the like as the travel environment. Further, when the position information and the speed information of the peripheral vehicle can be acquired by the vehicle-to-vehicle communication, the travel environment may be recognized by using the information as well.

It is preferable that the travel environment recognition unit 24 distinguishes whether the peripheral object detected by the peripheral monitoring sensor 5 is a moving object or a stationary object. It is also preferable to distinguish and recognize the types of peripheral objects. The types of peripheral objects may be distinguished and recognized by performing pattern matching on the images captured by the peripheral monitoring camera.

The type may be recognized by distinguishing a structure such as a guardrail, a falling object on the road, a pedestrian, a bicycle, a motorcycle, an automobile, or the like. Whether the peripheral object is a moving object or a stationary object may be recognized according to the type of the peripheral object. For example, if the type of peripheral object is a structure or a falling object on the road, it may be recognized as a stationary object. If the type of peripheral object is a pedestrian, a bicycle, a motorcycle, or a car, it may be recognized as a moving object. An object that is unlikely to move immediately, such as a parked vehicle, may be recognized as a stationary object. A parked vehicle may be recognized because it is stopped and it can be recognized by image recognition that the brake lamp is not lit. As a type of moving object, for example, a pedestrian may be further subdivided to distinguish between a child and an adult. The distinction between children and adults may be made according to their height.

Further, it is preferable that the travel environment recognition unit 24 also recognizes the recognized behavior of the moving object. As an example, it may be recognized whether the moving object is stationary or moving based on the presence or absence of a change in the position of the moving object to be recognized sequentially along the time series. In addition, the rate of change in the traveling direction of the moving object may be recognized as the behavior of the moving object. As an example, the rate of change in the traveling direction of the moving object may be calculated by specifying the traveling direction of the moving object from the changes along the time series of the positions of the moving objects to be recognized sequentially. It can be said that the larger the rate of change in the traveling direction, the more the moving object is staggering. The travel environment recognition unit 24 corresponds to a recognition unit.

The travel environment recognition unit 24 includes a counting unit 241 as a sub-functional block. The counting unit 241 counts the number of moving objects detected around the host vehicle by distinguishing between the moving object on the left side and the moving object on the right side of the host vehicle. This counting unit 241 corresponds to a counting unit. The counting unit 241 does not count the object recognized as a stationary object by the travel environment recognition unit 24, but counts the object recognized as a moving object.

It is preferable that the counting unit 241 counts the number of moving objects with a larger weight as the type of the moving object has a higher priority to be protected in terms of traffic. The priority to be protected in terms of traffic may be higher as the possibility that the damage to the human body as the moving object is greater when the host vehicle collides with the moving object. In addition, the priority to be protected in terms of traffic may be higher as the rate of negligence of the vehicle in insurance is higher when the vehicle collides with the moving object. As an example, the weighting to the pedestrian may be greater than that of other types of moving objects. Further, for example, the weighting according to the types may be pedestrian>bicycle>motorcycle>automobile. In addition, when the number of moving objects is weighted and counted, 1 (one) may be multiplied by a coefficient to count.

The coefficient may be an integer or may not be an integer. If the coefficient is not an integer, then the number of moving objects counted is also not an integer.

The probability calculation unit 25 calculates the potential occurrence probability, which is the probability of occurrence of potential proximity between the host vehicle and an obstacle, using the environmental information acquired by the environmental information acquisition unit 23. The potential occurrence probability is an example of an index showing the potential possibility of occurrence of proximity between the vehicle and an obstacle. In the present embodiment, the potential occurrence probability is used as an index showing the potential possibility that the vehicle and the obstacle are close to each other. However, the above possibility may be expressed by an expression method other than probability, such as expressing by a level such as high, medium, and low.

The potential probability of occurrence may be limited to the probability of occurrence of proximity between the potential vehicle and a pedestrian. The probability calculation unit 25 calculates the potential occurrence probability using the environmental information based on the correlation between the environmental information and the potential occurrence probability.

For example, the potential occurrence probability is considered to increase as the possibility P of a pedestrian jumping out increases. As shown in A of FIG. 2, it is considered that the possibility P of the pedestrian jumping out increases as the distance from the place where more people gather increases. Therefore, the probability calculation unit 25 may calculate the potential occurrence probability higher as the vehicle position of the host vehicle becomes closer to the position of a facility where people gather, such as a school, a station, or an event venue. The positions of the school and the station may be specified from the map data acquired by the map information acquisition unit 231. The location of the event venue may be specified from the event information acquired by the infrastructure information acquisition unit 232. The vehicle position of the host vehicle may be specified from the vehicle position of the host vehicle acquired by the host vehicle position acquisition unit 21.

In this way, when the factor that increases the potential occurrence probability (hereinafter referred to as the target factor) is the location, the potential occurrence probability may be calculated lower as the distance between the target factor and the host vehicle increases. In other words, when the environmental information used for calculating the potential occurrence probability includes information on a place that is a factor for increasing the potential occurrence probability, the probability calculation unit 25 may calculate the potential occurrence probability lower as the distance between the place and the host vehicle increases.

Figure 2:
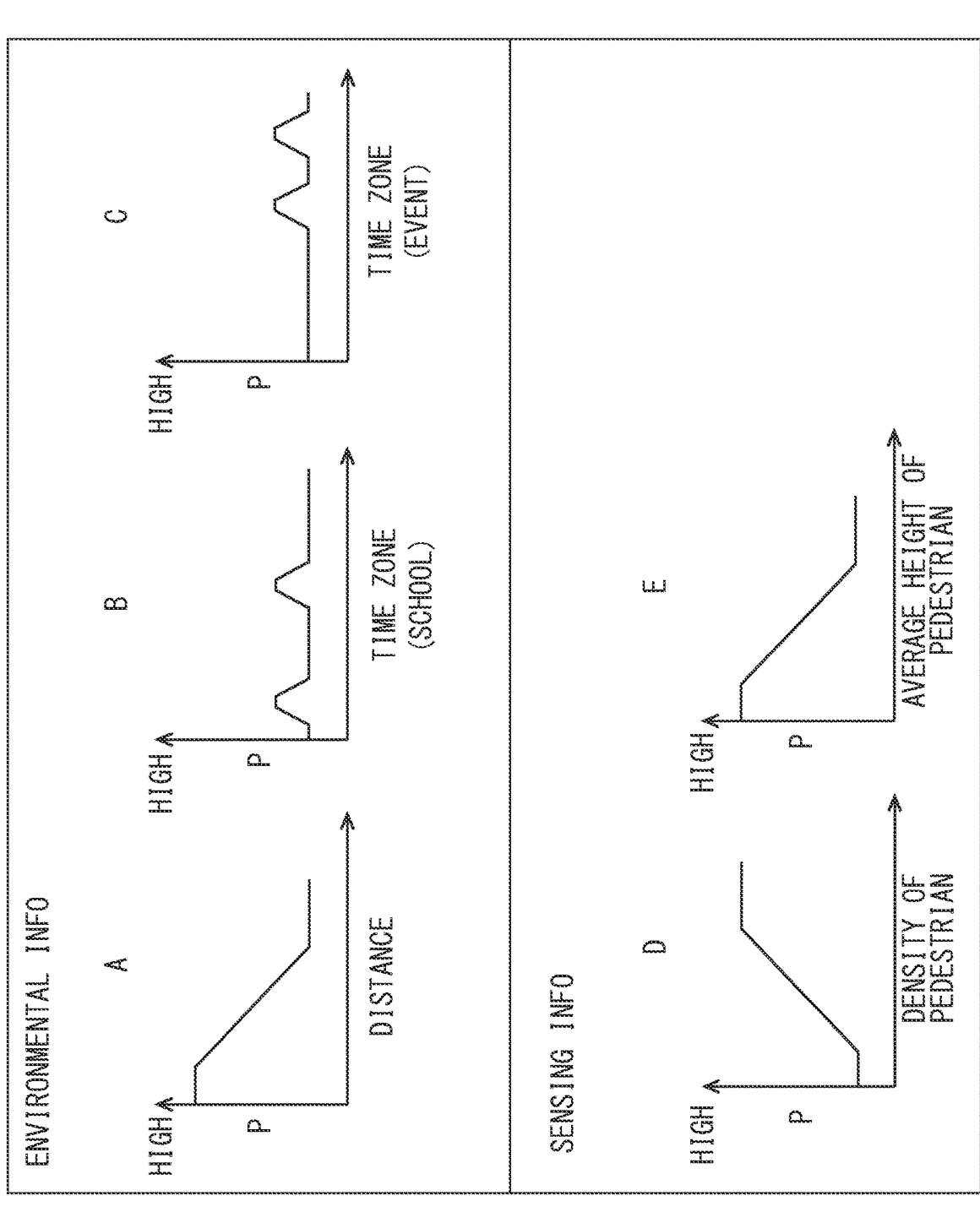
FIG. 2 is a diagram illustrating a relation between the possibility of a pedestrian's jumping-out and a factor on a factor-by-factor basis.

Further, as shown in B and C of FIG. 2, the potential occurrence probability is considered to change depending on the time zone. For example, when the target factor is school, it is considered that the possibility P of the pedestrian jumping out reaches two peaks as shown in B of FIG. 2 in the time zones of the time of going to school and the time of leaving school. For example, when the target factor is the event venue, it is considered that the possibility P of the pedestrian jumping out reaches two peaks as shown in C of FIG. 2 before and after the time zone of the event. For example, when the target factor is a station, it is considered that the possibility P of pedestrians jumping out changes according to the average number of users for each time zone. Therefore, the probability calculation unit 25 may calculate the potential occurrence probability according to the time zone for each target factor. The time to go to school, the time to leave school, and the average number of users by time zone of the station may be specified from the facility usage information acquired by the infrastructure information acquisition unit 232. The event end time may be specified from the time zone of the event in the event information acquired by the infrastructure information acquisition unit 232. If the target factor is a station, the possibility P of a moving object jumping out other than a pedestrian jumping out is also considered to increase as the average number of users is large.

The potential occurrence probability is considered to change depending on the weather. For example, when the weather is snow, it is highly likely that the moving object will not be able to stop and will jump out, or the braking distance of the host vehicle will be extended. Therefore, the probability calculation unit 25 may calculate a higher potential occurrence probability when the weather is snow than when the weather is not snow. In addition, when the weather is rainy, it is considered that the possibility P of a moving object jumping out other than a pedestrian jumping out at a facility such as a station for pick-up and drop-off increases, or the braking distance of the host vehicle increases. Therefore, when the weather is rainy, the probability calculation unit 25 may calculate a higher potential occurrence probability for the target factors such as stations than when the weather is not rainy.

The potential occurrence probability is considered to change depending on the temperature. For example, if the temperature is low enough to freeze the road surface, it is highly likely that the moving object will be unable to stop and jump out, or the braking distance of the host vehicle will be extended. Therefore, when the temperature is equal to or lower than the threshold temperature at which the road surface is estimated to freeze, the probability calculation unit 25 may calculate a higher potential occurrence probability than when the temperature is higher than the threshold temperature.

The potential occurrence probability is considered to change depending on the place of travel. For example, the more people there are, the higher the possibility of pedestrians and bicycles jumping out is. Therefore, the probability calculation unit 25 may calculate the higher potential occurrence probability as the area where the host vehicle travels is an area with more people. As an example, the type of area may be downtown>suburban road>expressway, in the order of areas with many people. In addition, it is considered that the larger the curve curvature, the higher the possibility that motorcycles and automobiles in the oncoming lane may protrude into the lane where the host vehicle travels. Therefore, the probability calculation unit 25 may calculate the higher potential occurrence probability as the road on which the host vehicle travels has a larger curve curvature. In addition, it is considered that the braking distance of the host vehicle increases as the downward vertical gradient increases. Therefore, the probability calculation unit 25 may calculate a high potential occurrence probability according to the increase in the downward vertical gradient of the lane where the host vehicle travels.

The potential occurrence probability is considered to be different for each lane on a road with multiple lanes on each traffic direction. For example, the closer the lane is to the sidewalk, the more likely it is that pedestrians and bicycles may jump out. Therefore, when the road where the host vehicle travels is a road with a plurality of lanes on one traffic direction, the probability calculation unit 25 may calculate the higher potential occurrence probability as the lane where the host vehicle travels is closer to the sidewalk.

Further, the probability calculation unit 25 may be configured to calculate the potential occurrence probability by additionally using the sensing information acquired by the sensing information acquisition unit 22. As shown in D and E of FIG. 2, the possibility P of pedestrian jumping out is considered to change depending on the density and average height of pedestrians. The pedestrian density is the number of pedestrians per predetermined range. For example, the probability calculation unit 25 may calculate the number of pedestrians per sensing range (i.e., density) and/or average height from the sensing information of the moving object recognized as a pedestrian by the travel environment recognition unit 24 among the peripheral objects detected by the peripheral monitoring sensor 5.

For example, as shown in D of FIG. 2, it is considered that as the density of pedestrians increases, the possibility of pedestrians jumping out also increases. In addition, it is considered that the more likely the pedestrian is a child, the higher the possibility of jumping out is. Therefore, as shown in E of FIG. 2, it is considered that the possibility of the pedestrian jumping out increases as the average height of the pedestrian decreases. Therefore, the probability calculation unit 25 may calculate a higher potential occurrence probability as the density of pedestrians increases. Further, the probability calculation unit 25 may calculate a higher potential occurrence probability as the average height of the pedestrian decreases.

Further, the probability calculation unit 25 may calculate the potential occurrence probability by integrating a plurality of factors. For example, taking FIG. 2 as an example, when the target factor is a school, the probability of jumping out of A, B, D, and E in FIG. 2 may be integrated as the likelihood LA, LB, LD, and LE, respectively, to calculate the potential occurrence probability. For example, the likelihood X1 in which the likelihood LA and LB are integrated is calculated by the formula $X1=LA \times LB/\{LA \times LB+(1-LA) \times (1-LB)\}$. Subsequently, the likelihood X2 in which the likelihood X1 and LD are integrated is calculated by the formula $X2=X1 \times LD/\{X1 \times LD+(1-X1) \times (1-LD)\}$. Finally, the likelihood X3 in which the likelihoods X2 and LE are integrated is calculated by the formula $X3=X2 \times LE/\{X2 \times LE+(1-X2) \times (1-LE)\}$. Then, the obtained likelihood X3 is used as a potential occurrence probability in which the likelihoods of A, B, D, and E are integrated. The combination of factors to be integrated is not limited to the above-mentioned example.

The automatic driving unit 26 performs processing related to the proxy of the driving operation by the driver. As shown in FIG. 1, the automatic driving unit 26 includes a travel planning unit 27, a confirmation unit 28, and an automatic driving function unit 29, as sub-functional blocks.

The travel planning unit 27 uses the travel environment recognized by the travel environment recognition unit 24 to generate a travel plan for driving the host vehicle by automatic driving. For example, as a medium- to long-term driving plan, a route search process is performed to generate a recommended route from the position of the host vehicle to a destination. In addition, as a short-term driving plan for driving according to the medium- to long-term driving plan, a driving plan for changing lanes, a driving plan for traveling in the center of the lane, a traveling plan for following the preceding vehicle, a traveling plan for avoiding obstacles, and the like are generated. The travel planning unit 27 may generate a travel plan by calculating a first route which is at a certain distance away from a recognized travel lane marking line or which is at a center from the recognized travel lane marking line, or a second route so as to follow the recognized behavior or the travel locus of the preceding vehicle.

Further, the travel planning unit 27 may generate a travel plan by calculating the route determined to be optimal by machine learning or the like. When calculating the route determined to be optimal by machine learning, the route calculation algorithm for calculating the route includes a neural network. An example of the value to be input to the neural network is the distance between the host vehicle and the peripheral vehicle and the relative speed of the peripheral vehicle with respect to the host vehicle. In addition, various travel environments recognized by the travel environment recognition unit 24 may be input to the neural network. The output of the neural network is a route.

This neural network is learned by machine learning such as reinforcement learning. Further, a plurality of types of route calculation algorithms can be prepared. The difference between multiple route calculation algorithms is the difference in driving policy. The driving policy indicates the degree and frequency of acceleration/deceleration and steering control when the vehicle is automatically driven. The driving policy appears, for example, in the difference between rapid acceleration and deceleration and slow acceleration and deceleration. The occupant of the vehicle can select which of the multiple route calculation algorithms corresponding to the plurality of driving policies to be used. When the route is calculated according to one selected route calculation algorithm, it can be said that the route is calculated based on the driving policy corresponding to the one selected route calculation algorithm.

The travel planning unit 27 calculates one or more routes as a short-term travel plan. For example, the travel planning unit 27 may be configured to include acceleration/deceleration information for speed adjustment on the calculated route as a short-term travel plan.

The confirmation unit 28 evaluates the safety of the travel plan generated by the travel planning unit 27. For example, the confirmation unit 28 is configured to evaluate the safety level of the travel plan using a mathematical formula model that formulates the concept of the safety driving for facilitating the evaluation of the safety level of the travel plan. The confirmation unit 28 may evaluate the safety based on whether or not the safety distance is greater than or equal to the inter-target distance that is a distance between the host vehicle and the peripheral object. The safety distance is a distance, which is calculated by a predetermined mathematical formula model and which is a criterion distance for evaluating the safety between the targets. As an example, the inter-target distance may be a distance in the front-rear direction and/or the left-right direction of the host vehicle.

The predetermined mathematical formula model does not guarantee that the accident will not occur completely. This is to ensure that if the distance is less than the safety distance, the person will not be responsible for the accident as long as he/she takes appropriate actions to avoid the collision. The safety distance calculated by the mathematical formula model can be rephrased as a distance from the vehicle that the vehicle should have at least with the obstacle in order to avoid the proximity of the vehicle to the obstacle.

Further, the confirmation unit 28 includes a safety distance setting unit 281 and a safety distance adjusting unit 282, as sub-functional blocks, and provides a margin for the safety distance depending on the situation. More specifically, as the potential occurrence probability calculated by the probability calculation unit 25 increases, a larger margin is given to the safety distance calculated using the mathematical formula model.

The safety distance setting unit 281 calculates the safety distance using the mathematical formula model described above, and sets the calculated safety distance as a safety distance. The safety distance setting unit 281 calculates and sets the safety distance using at least the information on the behavior of the vehicle. As the mathematical formula model, the safety distance setting unit 281 may use, for example, an RSS (Responsibility Sensitive Safety) model.

The safety distance setting unit 281 sets the safety distance in the front direction and/or left-right direction of the host vehicle. The following will describe a case where the safety distance setting unit 281 sets the safety distance in the front direction and left-right direction of the host vehicle as an example. When the safety distance setting unit 281 adopts a configuration for setting a safety distance in the front direction or left-right direction of the host vehicle, it may be configured to perform the process described below for the direction for setting the safety distance.

As a criterion in the front direction of the host vehicle, the safety distance setting unit 281 may calculate, for example, the shortest distance traveled by the host vehicle up to the time when the vehicle can stop in the front direction. Taking FIG. 3 as an example, the HV in FIG. 3 indicates the host vehicle, and Fw indicates the safety distance in the front direction as a criterion. As a specific example, the safety distance in the front direction may be calculated from the speed, maximum acceleration, maximum deceleration, and response time of the host vehicle. That is, the safety distance is s distance traveled by the host vehicle while the vehicle travels forward at the maximum acceleration during the response time from the current vehicle speed, then decelerates at the maximum deceleration, and stops. The speed, maximum acceleration, and maximum deceleration of the host vehicle here are for the front-rear direction of the host vehicle. The response time here may be the time from the instruction of the operation to the braking device to the start of the operation when the host vehicle is stopped by the automatic driving.

Even when the safety distance setting unit 281 does not recognize a moving object but recognizes a stationary object in front of the host vehicle, the safety distance setting unit 281 may set the safety distance as a criterion in the front direction of the vehicle. When the safety distance setting unit 281 recognizes a moving object in front of the host vehicle, the safety distance setting unit 281 may calculate, as the safety distance, the distance traveled by the host vehicle up to the time when the host vehicle stops without contacting the moving object from the information on the behaviors of the host vehicle and the moving object.

Figure 3:
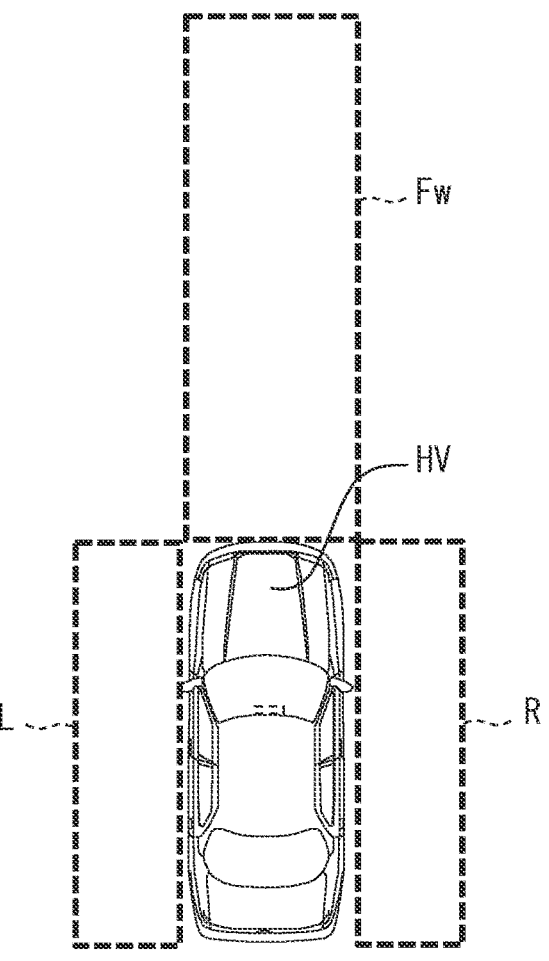
FIG. 3 is a diagram illustrating an example of a safety distance in the front and left-right directions of a host vehicle as a criterion.

As a criterion in the left-right direction of the host vehicle, the safety distance setting unit 281 may calculate the shortest distance traveled by the host vehicle up to the time when the host vehicle can reduce the speed to 0 (zero) in the left-right direction, from the behavior information of the host vehicle. For example, from the left-right speed, maximum acceleration, maximum deceleration, and response time of the vehicle, the safety distance setting unit 281 may calculate the distance traveled by the host vehicle while the host vehicle moves left-right with maximum acceleration during the response time from the current left-right speed, then moves left-right, and decelerates at maximum deceleration to cause the left-right speed to be 0 (zero) as the safety distance in the left-right direction. The response time here may be the time from the instruction of the operation to the steering device to the start of the operation when the host vehicle is steered by automatic driving. As a criterion, the safety distance setting unit 281 may be configured to evenly set the ratio of the left and right safety distances of the host vehicle as shown in FIG. 3. In FIG. 3, L indicates the safety distance in the left direction of the host vehicle, and R indicates the safety distance in the right direction of the host vehicle.

Even when the safety distance setting unit 281 does not recognize a moving object but recognizes a stationary object in the left-right direction of the host vehicle, the safety distance setting unit 281 may set the safety distance as a criterion in the left-right direction of the vehicle. Suppose a case where the safety distance setting unit 281 recognizes a moving object in one of the left direction and the right direction of the host vehicle. In such a case, the safety distance setting unit 281 may calculate, as the safety distance, the distance traveled in the one of the left direction and the right direction by the host vehicle up to the time when the host vehicle can reduce the speed in the one of the left direction and the right direction to 0 (zero) without contacting the moving object from the information on the behaviors of the host vehicle and the moving object. Therefore, when the moving object is recognized in the left-right direction of the host vehicle, the ratio of the left and right safety distances of the host vehicle may not be maintained evenly.

Further, the safety distance setting unit 281 may be configured to estimate the safety distance in the front direction of the following vehicle that follows the host vehicle. In this case, the safety distance in the front direction for the following vehicle may be the distance traveled in the front direction by the following vehicle while the following vehicle traveling forward at the current vehicle speed accelerates at the maximum acceleration during the response time, and then decelerates at the maximum deceleration without contacting the host vehicle in cases where the host vehicle traveling forward at the current speed decelerates at the maximum deceleration. The speed, maximum acceleration, and maximum deceleration of the following vehicle here are for the front-rear direction of the following vehicle. The response time here may be the time from the instruction of the operation to the braking device to the start of the operation when the vehicle is stopped by the automatic driving.

If the maximum acceleration, maximum deceleration, and response time of the following vehicle can be acquired from the following vehicle by vehicle-to-vehicle communication, the information acquired by vehicle-to-vehicle communication may be used by the safety distance setting unit 281. The vehicle speed of the following vehicle may use the one recognized by the travel environment recognition unit 24. In addition, for the maximum acceleration, maximum deceleration, and response time of the following vehicle, the values of the general vehicle can be stored in advance in the non-volatile memory of the automatic driving device 2. The safety distance setting unit 281 may be configured to use the values of the general vehicle stored in the memory. The safety distance setting unit 281 may set the estimated safety distance in the front direction of the following vehicle as the safety distance in the rear direction of the host vehicle.

The safety distance adjusting unit 282 increases the safety distance set by the safety distance setting unit 281 as the potential occurrence probability calculated by the probability calculation unit 25 increases. The safety distance to be increased may be the safety distance in the front direction of the host vehicle or the safety distance in the left-right direction of the host vehicle.

For example, the safety distance adjusting unit 282 increases the safety distance in the front direction of the host vehicle set by the safety distance setting unit 281 as the potential occurrence probability calculated by the probability calculation unit 25 increases. The association between the potential occurrence probability and the increase in the safety distance in the front direction of the vehicle can be set as needed.

According to the above configuration, it is possible to increase the safety distance in the front direction of the host vehicle as the possibility of a moving object such as a pedestrian jumping out increases. Therefore, even if the moving object jumps out in front of the host vehicle, it is possible to take an evasive action to avoid the proximity to the moving object as soon as possible. Therefore, it becomes possible to make it easier to avoid proximity to an obstacle during automatic driving of the vehicle.

For example, the safety distance adjusting unit 282 may increase the safety distance in the left-right direction of the host vehicle set by the safety distance setting unit 281 according to the increase in the potential occurrence probability calculated by the probability calculation unit 25. The association between the potential occurrence probability and the increase in the safety distance in the left-right direction of the host vehicle can be set as needed.

According to the above configuration, it is possible to increase the safety distance in the left-right direction of the host vehicle as the possibility of a moving object such as a pedestrian jumping out increases. Therefore, even if the moving object jumps out from the left-right direction of the host vehicle, it is possible to take an evasive action to avoid the proximity to the moving object as soon as possible. Therefore, it becomes possible to make it easier to avoid proximity to an obstacle during automatic driving of the vehicle. In addition, when increasing the safety distance in the left-right direction of the host vehicle, the host vehicle travels while having a wider space with the parked vehicle or the structure in the left-right direction of the host vehicle. Therefore, it becomes easier to see the host vehicle from the moving object that is about to jump out behind the parked vehicle or the structure. Therefore, it is possible to suppress the jumping out of the moving object by making it easier for the moving object to check the host vehicle.

In addition, suppose a case where the potential probability calculated by the probability calculation unit 25 is equal to or greater than a threshold value. In such a case, the safety distance adjusting unit 282 may increase only the safety distance on the side where the number of moving objects counted by the counting unit 241 is large among the left and right safety distances of the host vehicle set by the safety distance setting unit 281. The threshold value referred to here is a value for distinguishing whether or not there is a high possibility that the moving object jumps out, and may be a value that can be set as needed. If the moving object is not recognized in the left-right direction of the host vehicle, the ratio of the safety distance being equal between the left direction and the right direction is changed by increasing the safety distance in either the left or right direction.

According to the above configuration, when the possibility of a moving object such as a pedestrian jumping out is high, it is possible to increase only the safety distance on the side with a large number of moving objects. Therefore, it is possible to increase only the safety of one of the left side and the right side on which the moving object is more likely to jump out. Suppose a case where the left and right safety distances of the host vehicle are increased regardless of whether the moving object is more likely to jump out from the left or right. In such a case, there is a risk that the host vehicle may take unnecessary avoidance actions by increasing the safety distance in a useless direction. On the other hand, the safety is increased on only one of the left and right sides of the host vehicle, in which the moving object is more likely to jump out. This makes it possible to avoid such waste and to avoid proximity to obstacles during automatic driving of the vehicle.

Figure 4:
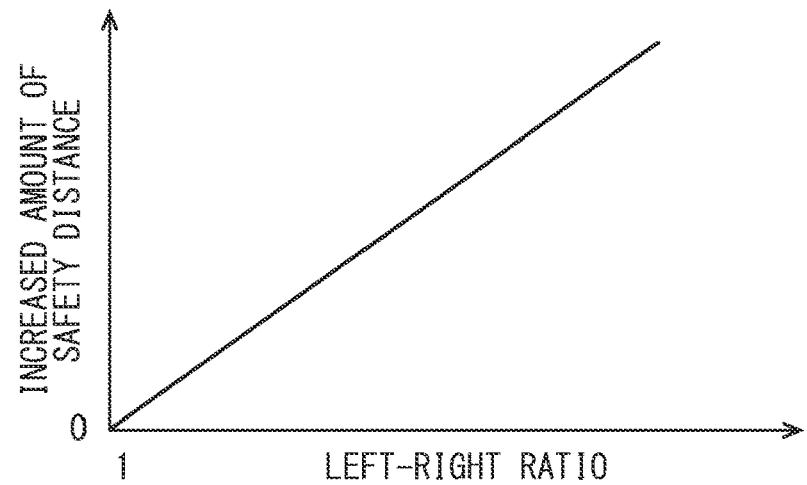
FIG. 4 is a diagram illustrating a relation between an increase in a safety distance and a ratio of left and right counts.

In addition, only the safety distance on the side with a larger number of moving objects counted by the counting unit 241 is increased. In that case, as shown in FIG. 4, the amount of increasing the safety distance may be increased as the ratio of the numbers (i.e., the counted numbers) of left and right moving objects of the host vehicle counted by the counting unit 241 increases. FIG. 4 is a diagram showing an example of the relation between the increase in the safety distance and the ratio of the counted numbers of the left and right moving objects of the host vehicle (hereinafter referred to as a left-right ratio).

If the same number of moving objects are distributed on both the left and right sides of the host vehicle, the host vehicle should be prepared for the moving objects to jump out from both the left and right directions. Therefore, it is preferable to travel near the center with respect to the left and right moving objects, and it is preferable that the left and right safety distances are not excessively biased to one of the left and right. On the other hand, if the distribution is biased to one of the left and right sides of the host vehicle, the host vehicle should be prepared for the moving object to jump out from this one side. Therefore, it is preferable to bias the safety distance to the side where the distribution is biased. According to the above configuration, the increased amount of the safety distance is larger as the ratio of the counted numbers of the left and right moving objects of the host vehicle is larger. Therefore, it is not necessary to uniformly increase the safety distance in both (i) the uniform case where the moving objects with the same counted number are distributed on both the left and right sides of the host vehicle, and (ii) the biased case where the distribution is biased to one of the left and right sides of the host vehicle. Therefore, depending on the distribution of the moving objects on the left and right of the host vehicle, it becomes easier to avoid the proximity to the obstacle.

Further, the counting unit 241 adopts a configuration in which the number of moving objects is counted with a larger weighting as the type of the moving object has a higher priority to be protected in terms of traffic. In that case, it is possible to bias the left and right safety distances of the host vehicle to the side of the left and right of the host vehicle, which has a higher priority to be protected in terms of traffic. Therefore, it becomes easier to avoid proximity to obstacles on one of the left and right sides of the host vehicle, the one which has a higher priority to be protected in terms of traffic.

When increasing the safety distance set by the safety distance setting unit 281, the safety distance adjusting unit 282 may change the rate of increase in the safety distance according to the type of the moving object recognized by the travel environment recognition unit 24. For example, as the type of the moving object has the higher possibility of jumping out, the rate of increase in the safety distance may be higher. In this case, the types of the moving objects recognized by the travel environment recognition unit 24 have the different levels of the possibility of jumping out. The rate of increase in the safety distance may be changed according to the types of the moving objects having the different levels of the possibility of jumping out. According to this, the higher the possibility that the recognizable moving object jumps out, the more the safety distance is increased. This makes it easier to avoid proximity to obstacles. As an example, when the type of the moving object is a child, the rate of increase in the safety distance may be changed higher than when the type of the moving object is an adult.

Further, the higher the priority of the type of moving object to be protected in terms of traffic, the higher the rate of increase in the safety distance may be. As an example, the types of the moving objects recognized by the travel environment recognition unit 24 have the different levels of the priority to be protected in terms of traffic. The rate of increase in the safety distance may be changed according to the types of the moving objects having the different levels of the priority to be protected in terms of traffic. According to this, the higher the priority for traffic protection of a recognizable vehicle, the greater the safety distance. As a result, it becomes easier to avoid proximity as the moving object has a higher priority to be protected in terms of traffic.

The safety distance adjusting unit 282 increases the safety distance set by the safety distance setting unit 281. At that time, the increase rate of the safety distance may be changed according to the behavior of the moving object recognized by the travel environment recognition unit 24. For example, as the behavior of the moving object has a higher possibility of jumping out, the rate of increase in the safety distance may be higher. In this case, the behaviors of the moving objects recognized by the travel environment recognition unit 24 have the different levels of the possibility of jumping out. The rate of increase in the safety distance may be changed according to the behaviors of the moving objects having the different levels of the possibility of jumping out. According to this, the higher the possibility that the recognizable moving object jumps out, the more the safety distance is increased. This makes it easier to avoid proximity to obstacles. As an example, when the behavior of the moving object is mobile, the increase rate of the safety distance may be changed to be higher than when the behavior of the moving object is stationary. Further, relating to the behavior of the moving object, the rate of increase in the safety distance may be changed to be higher as the rate of change in the traveling direction of the moving object increases. That is, the rate of increase in the safety distance may be changed higher as the wobbling of the moving object increases.

Figure 5:
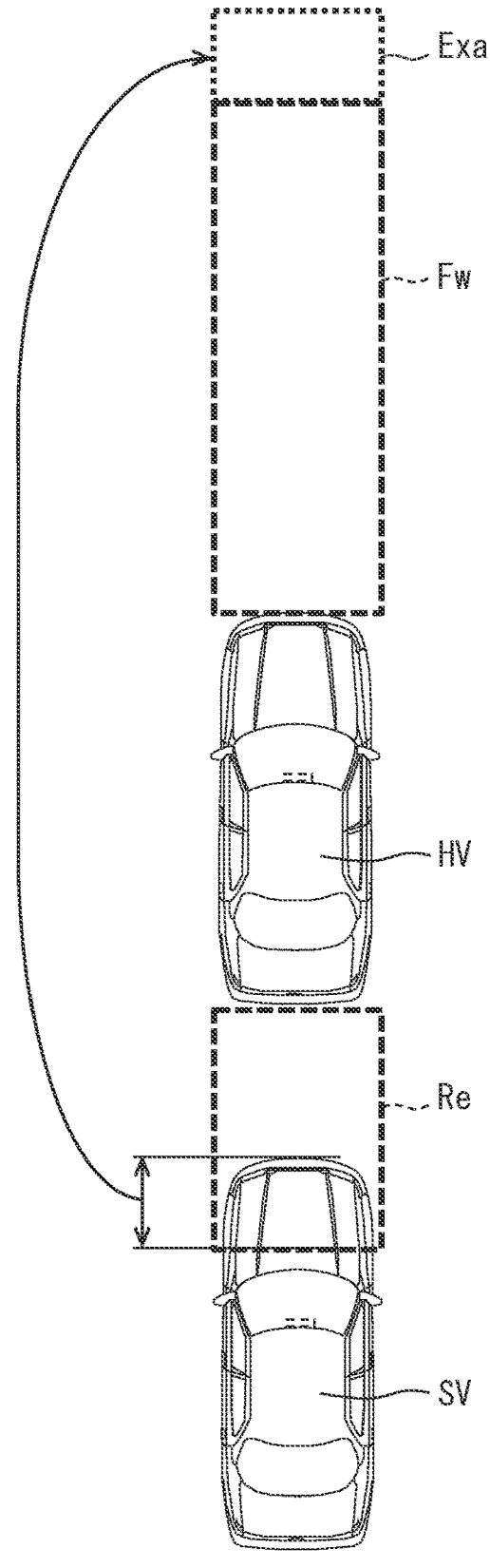
FIG. 5 is a diagram illustrating an example of increasing a safety distance in front of a host vehicle.

As shown in FIG. 5, a distance (hereinafter referred to as a following vehicle distance) of the host vehicle from the following vehicle becomes less than the safety distance in the front direction of the following vehicle estimated by the safety distance setting unit 281. In this case, the safety distance adjusting unit 282 may increase the safety distance in the front direction of the host vehicle set by the safety distance setting unit 281, by the distance (i.e., shortage distance) by which the following vehicle distance is less than the safety distance in the front direction of the following vehicle. In FIG. 5, the HV indicates the host vehicle, the SV indicates the following vehicle, Fw indicates the safety distance in the front direction of the host vehicle, and Re indicates the distance corresponding to the safety distance in the front direction of the following vehicle. Further, Exa in FIG. 5 shows a distance (i.e., shortage distance) by which the following vehicle distance is less than the safety distance in the front direction of the following vehicle. The following vehicle distance may be recognized by the travel environment recognition unit 24.

According to the above configuration, the distance corresponding to the shortage in the safety distance in the front direction of the following vehicle is added to the safety distance in the front direction of the host vehicle. Here, a case where the host vehicle stops at a safety distance from an obstacle in front of the host vehicle and the following vehicle also stops will be described. By increasing the safety distance in the front direction of the host vehicle, the host vehicle can stop at a safety distance without decelerating at the maximum deceleration. The safety distance in the front direction of the following vehicle is a value assuming that the host vehicle decelerates at the maximum deceleration. Therefore, as the host vehicle decelerates at a deceleration lower than the maximum deceleration, the distance that the following vehicle can travel without contacting the vehicle increases. Here, the increased amount (i.e., extended distance) of the safety distance in the front direction of the host vehicle corresponds to the shortage amount of the safety distance in the front direction for the following vehicle. Therefore, the following vehicle can stop without contacting the host vehicle due to this extended distance. Therefore, in this respect as well, it is possible to make it easier to avoid proximity to an obstacle during automatic driving of the vehicle.

Figure 6:
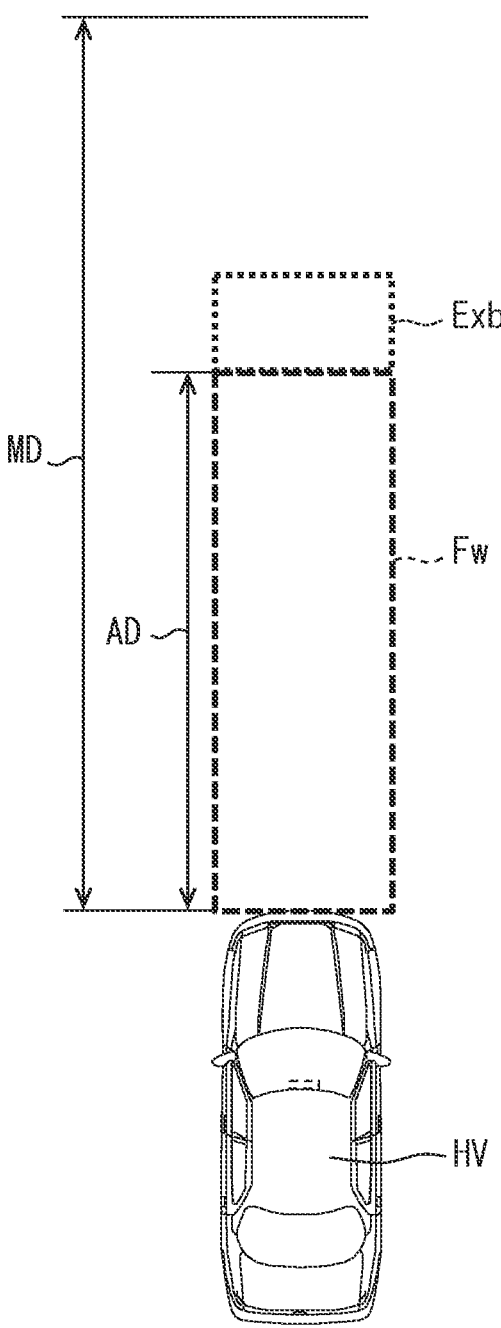
FIG. 6 is a diagram illustrating a preferred range for increasing a safety distance.

Further, the safety distance adjusting unit 282 increases the safety distance set by the safety distance setting unit 281. See FIG. 6, the shortest distance that the host vehicle is assumed to run up to the time when being stopped by the automatic driving is shown as "AD" in FIG. 6. The stop distance as the sum of the idle running distance and the braking distance estimated when the host vehicle is stopped by manual driving is shown as "MD" in FIG. 6. In this case, the safety distance adjusting unit 282 may preferably increase the safety distance to be within a range that is longer than the shortest distance "AD" and less than the stop distance "MD". That is, the distance obtained by subtracting the safety distance set by the safety distance setting unit 281 from the stop distance may be set as the upper limit value when increasing the safety distance. In FIG. 6, Fw indicates the safety distance in the front direction of the host vehicle, and Exb indicates the distance corresponding to the increase in the safety distance. Regarding the stop distance, the association between the stop distance and the speed of the host vehicle may be stored in advance in the non-volatile memory of the automatic driving device 2. Thereby, the safety distance adjusting unit 282 may be configured to specify the stop distance by using the association between the stop distance and the speed of the host vehicle.

According to the above configuration, even when the safety distance is increased, the safety distance is set to be less than the stop distance by manual driving. This makes it possible to take evasive action more quickly than during manual driving. However, even if it cannot be avoided, it is possible to claim that it could not be avoided even by manual driving.

When the distance between the targets is equal to or greater than the safety distance set by the safety distance setting unit 281, the confirmation unit 28 may evaluate that the travel plan generated by the travel planning unit 27 has a safety (i.e., is safe). On the other hand, when the distance between the targets is less than this safety distance, the confirmation unit 28 may evaluate that the travel plan generated by the travel planning unit 27 has no safety (i.e., is not safe). The confirmation unit 28 may output the travel plan evaluated as having safety to the automatic driving function unit 29. On the other hand, the confirmation unit 28 may modify the travel plan evaluated as having no safety into, for example, a travel plan evaluated as having safety and output it to the automatic driving function unit 29. That is, whether or not the route calculated by the travel planning unit 27 is used for automatic driving is evaluated based on whether or not the distance between the targets is equal to or greater than the safety distance.

The automatic driving function unit 29 causes the vehicle control ECU 6 to automatically accelerate/decelerate and/or steer the host vehicle according to the travel plan output from the confirmation unit 28. Therefore, the vehicle control ECU 6 may be caused to perform the driving operation on behalf of the driver (i.e., automatic driving). The automatic driving function unit 29 causes the vehicle control ECU 6 to perform the automatic driving along the route that the confirmation unit 28 evaluates to be used for automatic driving. The automatic driving function unit 29 causes the vehicle control ECU 6 to perform the automatic driving according to the travel plan output from the confirmation unit 28. By doing so, the avoidance action for avoiding the proximity of the host vehicle to the peripheral object is automatically performed.

Further, the automatic driving function unit 29 includes a response time adjusting unit 291 and a lane change unit 292, as sub-functional blocks. The response time adjusting unit 291 adjusts the response time from the instruction of an operation to the braking device to the start of the operation when the host vehicle is stopped by the automatic driving. As an example, it is assumed that the braking device has a certain margin (hereinafter referred to as play time) other than the minimum time that cannot be shortened in this response time as a default during automatic driving. The response time adjusting unit 291 may control the braking device to change the play time.

The response time adjusting unit 291 may have a margin in the response time when the potential occurrence probability calculated by the probability calculation unit 25 is less than the above-mentioned threshold value. On the other hand, when the potential occurrence probability calculated by the probability calculation unit 25 is equal to or greater than the threshold value, the response time adjusting unit 291 may adjust the response time to be shorter than when the potential occurrence probability calculated by the probability calculation unit 25 is less than the threshold value.

As an example, the response time adjusting unit 291 may be configured to change the play time to be shorter than the default when the potential occurrence probability is less than the threshold value. According to this, when the possibility of the moving object jumping out becomes high, it becomes possible to change the response time to a shorter time to make it easier to avoid the proximity to the obstacle. The shorter the response time, the easier it is to avoid proximity to obstacles. Therefore, it is more preferable that the response time adjusting unit 291 changes the play time to 0 (zero) when the potential occurrence probability is less than the threshold value.

The lane change unit 292 causes the vehicle to change lanes by automatic driving. The lane change unit 292 may change the lane of the host vehicle by automatic driving according to the lane change travel plan generated by the travel planning unit 27. As an example, the travel planning unit 27 may generate a travel plan to make a lane change to a lane having a lower potential occurrence probability on the following three conditions are satisfied concurrently. A first condition is that the potential occurrence probability calculated by the probability calculation unit 25 is equal to or greater than the above-mentioned threshold value. A second condition is that the road on which the host vehicle is traveling is a road with multiple lanes on one traffic direction. A third condition is that the running lane of the host vehicle is not the lane having the lowest potential occurrence probability calculated by the probability calculation unit 25 among the multiple lanes on one traffic direction. As a result, the lane change unit 292 causes the host vehicle to make a lane change to the lane having a lower potential occurrence probability under the above-mentioned conditions. The lane to be changed is limited to a lane having a link direction identical to the link direction of the traveling lane of the host vehicle.

According to the above configuration, the possibility of the moving object jumping out is reduced by the amount of changing lanes to the lane where the possibility of the moving object jumping out is lower. Therefore, it becomes easier to avoid the proximity to the obstacle by reducing the possibility of the moving object jumping out.

<Potential Occurrence Probability Related Process in Automatic Driving Device 2>

Figure 7:
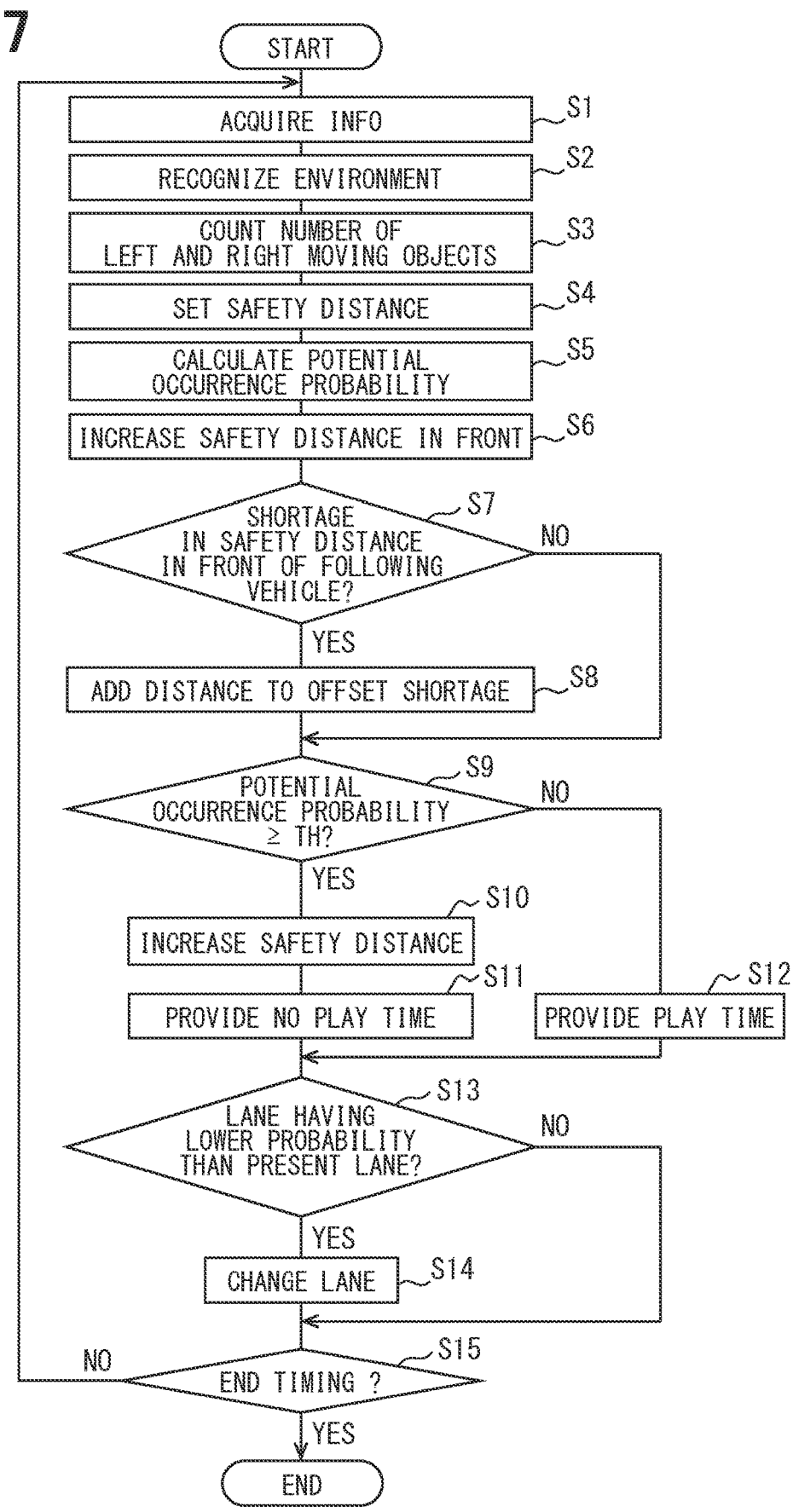
FIG. 7 is a flowchart showing an example of a sequence of processing related to potential occurrence probability.

Here, an example of the sequence of processing according to the potential occurrence probability in the automatic driving device 2 (hereinafter, potential occurrence probability related process) will be described with reference to the flowchart of FIG. 7. Execution of the steps included in the potential occurrence probability related process by the computer corresponds to the execution of the automatic driving method. The flowchart of FIG. 7 may be configured to start when the switch for starting the internal combustion engine or the motor generator of the host vehicle (hereinafter, power switch) is turned on and the automatic driving is started. In addition, in the case of a configuration that can switch between manual driving and automatic driving of the host vehicle, it may be configured to start when the power switch is turned on while the automatic driving is set. In addition, it may be configured to start when the setting for performing automatic driving is switched on during manual driving and switched to automatic driving during manual driving.

First, in step S1, various information is acquired. In S1, the host vehicle position acquisition unit 21 acquires the vehicle position of the host vehicle. In S1, the sensing information acquisition unit 22 acquires the sensing information. In S1, the environmental information acquisition unit 23 acquires the environmental information. As the environmental information, the map information acquisition unit 231 acquires the map data, and the infrastructure information acquisition unit 232 acquires the infrastructure information.

In S2, the travel environment recognition unit 24 recognizes the travel environment of the host vehicle. In step S3, the counting unit 241 weights the number of moving objects detected around the host vehicle according to the type of the moving object, and counts the moving object on the left side and the moving object on the right side of the host vehicle separately.

In step S4, the safety distance setting unit 281 calculates the safety distance using a mathematical formula model, and sets the calculated safety distance as a safety distance. Here, the safety distance in the front direction of the host vehicle and the safety distance in the left-right direction of the host vehicle are set. Further, the moving object may be recognized as a peripheral object of the host vehicle in S2. In this case, for the safety distance in the recognized direction of the moving object, the safety distance is calculated by using the information on the behavior of the moving object. When the following vehicle of the host vehicle is recognized in S2, the safety distance setting unit 281 also estimates the safety distance in the front direction of the following vehicle.

In step S5, the probability calculation unit 25 calculates the potential occurrence probability using the environmental information acquired in S1. In step S6, the safety distance adjusting unit 282 increases the safety distance in the front direction of the host vehicle set in S4 according to the increase in the potential occurrence probability calculated in S5.

In step S7, when the following vehicle of the host vehicle is recognized in S2 and the following vehicle distance of the host vehicle to the following vehicle is less than the safety distance in the front direction of the following vehicle estimated in S4, the safety distance in the front direction of the following vehicle is determined to have a shortage (YES in S7). Thereafter, the process proceeds to step S8. On the other hand, if the safety distance in the front direction of the following vehicle has no shortage (NO in S7), the process proceeds to step S9. In step S8, the safety distance adjusting unit 282 adds a distance (i.e., shortage distance) by which the following vehicle distance is less than the safety distance in the front direction of the following vehicle, to the safety distance in the front direction of the host vehicle set in S4.

In step S9, if the potential occurrence probability calculated in S5 is equal to or greater than the above-mentioned threshold value (YES in S9), the process proceeds to step S10. On the other hand, when the potential occurrence probability calculated in S5 is less than the threshold value (NO in S9), the process proceeds to step S12.

In step S10, the safety distance adjusting unit 282 increases only one of the left and right safety distances of the host vehicle set in S4, the one which has a larger number of moving objects counted in S3. In step S11, the response time adjusting unit 291 assumes that no play time is provided in the response time. Then, the process proceeds to step S13. On the other hand, in step S12, the response time adjusting unit 291 assumes that a play time is provided in the response time.

In step S13, it is determined whether the road on which the host vehicle is traveling is a road with a plurality of lanes on one traffic direction, and there is a lane in which the potential occurrence probability calculated by the probability calculation unit 25 is lower than the lane on which the host vehicle is traveling. When step S13 is affirmed (YES in S13), the process proceeds to step S14. On the other hand, when step S13 is negated (NO in S13), the process proceeds to step S15. In step S14, the lane change unit 292 causes the automatic driving to make a lane change to the lane with a lower potential occurrence probability calculated by the probability calculation unit 25 than the lane on which the host vehicle is traveling.

In step S15, when it is the end timing of the potential occurrence probability related process (YES in S15), the potential occurrence probability related process is terminated. On the other hand, when it is not the end timing of the potential occurrence probability related process (NO in S15), the process returns to S1 and the process is repeated. As an example of the end timing of the potential occurrence probability related process, there is a case where the power switch of the host vehicle is turned off, a case where the driving mode is switched to the manual driving, and the like. The flowchart of FIG. 7 is merely an example, and the order of processing may be partially changed.

Brief of First Embodiment

According to the configuration of the first embodiment, the possibility of proximity to an obstacle that changes depending on the peripheral environment other than the behavior of the host vehicle is expressed by the potential occurrence probability. Then, at least the safety distance set by using the information on the behavior of the vehicle is increased as the potential occurrence probability increases. Therefore, it is possible to increase the safety distance according to the high possibility of proximity to an obstacle that changes depending on the peripheral environment other than the behavior of the vehicle. Therefore, even if the possibility of proximity to an obstacle increases due to the peripheral environment other than the behavior of the host vehicle, it becomes easier to avoid the proximity to the obstacle by the amount of increasing the safety distance. As a result, it becomes possible to make it easier to avoid proximity to an obstacle during automatic driving of the vehicle.

Second Embodiment

In the first embodiment, the response time adjusting unit 291 shows a configuration for adjusting the play time provided in the response time, but the present disclosure is not necessarily limited to this. For example, the automatic driving function unit 29 may not be provided with the response time adjusting unit 291 and may be configured not to adjust the play time provided in the response time.

Third Embodiment

In the first embodiment, the lane change unit 292 is configured to cause the host vehicle to make a lane change to the lane having a lower potential occurrence probability calculated by the probability calculation unit 25 than the lane in which the host vehicle is running. However, there is no need to be limited thereto. For example, the potential occurrence probability may not be calculated for each lane of a road having a plurality of lanes on each traffic direction, and the lane may not be changed according to the potential occurrence probability for each lane.

Fourth Embodiment

In the first embodiment, among the left and right safety distances of the host vehicle set by the safety distance setting unit 281, only the safety distance on the side where the number of moving objects counted by the counting unit 241 is larger is increased. However, it is not necessarily limited to this. For example, the counting unit 241 is not provided in the travel environment recognition unit 24, and each of the left and right safety distances of the host vehicle set by the safety distance setting unit 281 is increased as the potential occurrence probability calculated by the probability calculation unit 25 increases.

Fifth Embodiment

In the first embodiment, both the map data acquired by the map information acquisition unit 231 and the infrastructure information acquired by the infrastructure information acquisition unit 232 are used to calculate the potential occurrence probability by the probability calculation unit 25. However, it is not necessarily limited to this. For example, in order to calculate the potential occurrence probability in the probability calculation unit 25, only one of the map data acquired by the map information acquisition unit 231 and the infrastructure information acquired by the infrastructure information acquisition unit 232 may be used.

Sixth Embodiment

In the first embodiment, the probability calculation unit 25 calculates the potential occurrence probability. However, it is not necessarily limited to this. For example, the safety distance may be increased according to the height of the potential occurrence probability by distinguishing the situations in which the height of the potential occurrence probability is different without calculating the potential occurrence probability. Situations in which the potential occurrence probabilities are different include, for example, a case where the potential occurrence probability is equal to or higher than the above-mentioned threshold value and a case where the potential occurrence probability is less than the above-mentioned threshold value. It should be noted that the situations in which the potential occurrence probabilities are different may be classified into three or more stages. When distinguishing situations with different potential occurrence probabilities without calculating the potential occurrence probability, the map or table may be referred to which associates in advance the combination of environmental information acquired by the environmental information acquisition unit 23 with the situations having different potential occurrence probabilities. Therefore, based on the environmental information acquired by the environmental information acquisition unit 23, the situations having the different high potential occurrence probabilities may be distinguished and specified.

The safety distance from the host vehicle is a distance that the host vehicle should have at least in between the host vehicle and an obstacle to avoid the proximity of the host vehicle to the obstacle. The potential occurrence probability is an occurrence probability of potential proximity between the host vehicle and an obstacle based on environmental information that is information about the environment in which the vehicle is placed, the environmental information precluding obstacles around the host vehicle. According to the sixth embodiment, the safety distance from the host vehicle may be increased as the potential occurrence probability increases. This potential occurrence probability is based on environmental information. Therefore, by increasing the safety distance as the potential occurrence probability increases, the safety distance can be increased as the possibility of proximity to obstacles that change depending on the peripheral environment other than the behavior of the host vehicle increases. In this case, even if the possibility of approaching an obstacle increases due to the peripheral environment other than the behavior of the host vehicle, it becomes easier to avoid the proximity to the obstacle by the increased amount of the safety distance. As a result, it becomes possible to make it easier to avoid proximity to an obstacle during automatic driving of the vehicle.

Seventh Embodiment

In the first embodiment, the default safety distance is calculated by a mathematical formula model. However, it is not necessarily limited to this. For example, the default safety distance may be calculated by a model other than the mathematical formula model. For example, the safety distance setting unit 281 may calculate the safety distance by using the information on the behavior of the host vehicle and the moving object around the host vehicle by another index such as TTC (Time To Collision).

Eighth Embodiment

Figure 8:
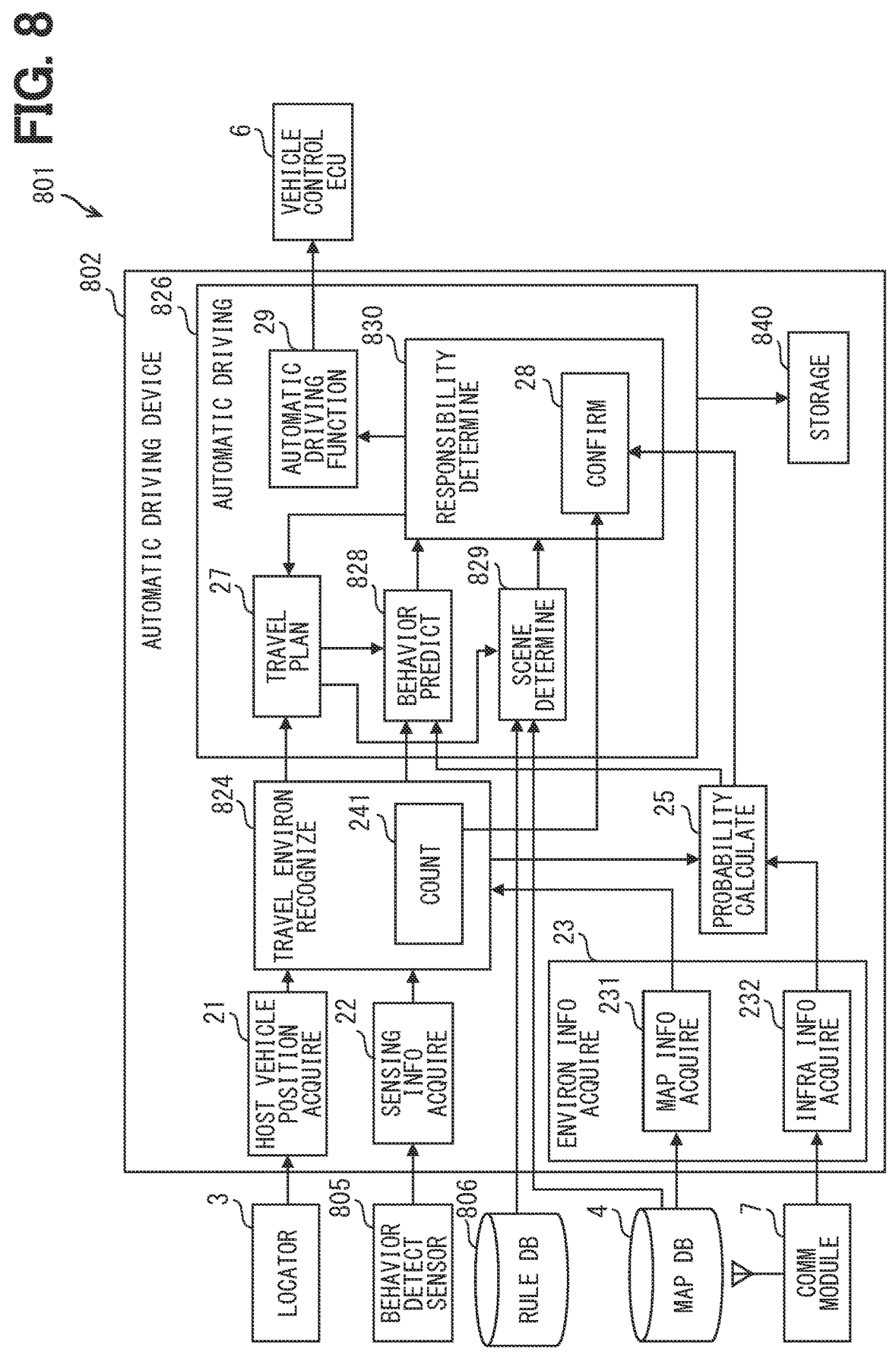
FIG. 8 is a block diagram of a vehicle system according to an eighth embodiment.

Next, an eighth embodiment will be described. FIG. 8 shows a configuration diagram of a vehicle system 801 according to an eighth embodiment. The vehicle system 801 of the eighth embodiment includes an automatic driving device 802, a behavior detection sensor 805, and a rule DB storage unit 806, as a configuration different from the vehicle system 1 of the first embodiment.

The behavior detection sensor 805, which is a sensor group including a plurality of sensors, includes the peripheral monitoring sensor 5 described in the first embodiment, and further includes a sensor for detecting the behavior of the host vehicle. The peripheral monitoring sensor 5 can detect the behavior of a moving object existing in the vicinity of the host vehicle and the non-moving obstacle existing in the vicinity of the host vehicle. The sensor for detecting the behavior of the host vehicle includes a sensor for detecting the speed and acceleration of the host vehicle and a sensor for detecting the moving direction of the host vehicle. Also in the first embodiment, the automatic driving device 2 may acquire the detected value from the sensor that detects the behavior of the host vehicle.

The region around the host vehicle (i.e., peripheral region) can be, for example, a rectangular region centered on the host vehicle and having sides parallel to the front-rear direction and the left-right direction of the host vehicle. The size of the rectangle can be such that the front direction of the host vehicle is about the stopping distance of the host vehicle. The rear of the vehicle may be the same as the front direction, or may be shorter than that. The size of the rectangle in the left-right direction of the host vehicle can be the length of one or several lanes. The size of the peripheral region can be set in various ways. In addition, the shape of the peripheral region can be set in various ways. For example, the shape of the peripheral region may be a perfect circle or an ellipse.

The rule DB storage unit 806 is a storage in which a rule database (hereinafter referred to as a rule DB) is stored. The rule DB is a database in which rules (hereinafter referred to as accident responsibility rules) that serve as criteria for determining responsibility for a potential accident, which will be described later, are stored. Accident responsibility rules for each location are stored in this rule DB. Accident responsibility rules by location include traffic directions such as one-way traffic, speed limits, and priority/non-priority distinction. Of course, accident responsibility rules also include location-independent rules. Accident responsibility rules that do not depend on location include rules such as associating signal lights with travel stopping, and giving priority to pedestrians over vehicles.

The automatic driving device 802, which may also be referred to as an automatic driving controller 802, is a device for automatically driving a vehicle, and is an example of a vehicle control device. Similar to the automatic driving device 2, the automatic driving device 802 executes an automatic driving method for automatically driving the host vehicle. The automatic driving method is an example of a vehicle control method.

The automatic driving device 802 is partially different in configuration from the automatic driving device 2 included in the vehicle system 1 of the first embodiment. Like the automatic driving device 2, the automatic driving device 802 includes a host vehicle position acquisition unit 21, a sensing information acquisition unit 22, an environmental information acquisition unit 23, and a probability calculation unit 25. Further, the automatic driving device 802 includes a travel environment recognition unit 824, an automatic driving unit 826, and a storage medium 840.

The travel environment recognition unit 824 is the same as the travel environment recognition unit 24 of the first embodiment in that the counting unit 241 described in the first embodiment is provided as a sub-function. Further, the travel environment recognition unit 824 has all the functions of the travel environment recognition unit 24 of the first embodiment. In addition, the travel environment recognition unit 824 also recognizes the current behavior of the host vehicle. The behavior of the host vehicle is determined based on the detection value of the sensor that detects the behavior of the host vehicle included in the behavior detection sensor 805. The behavior of the host vehicle can be expressed by, for example, a predetermined index including the current speed, acceleration, and yaw rate of the host vehicle.

The automatic driving unit 826 includes a behavior prediction unit 828, a scene determination unit 829, and a responsibility determination unit 830 in addition to the travel planning unit 27, the confirmation unit 28, and the automatic driving function unit 29 described in the first embodiment.

The behavior prediction unit 828 predicts the behavior of the moving object to be predicted. The predicted target moving object is a concept including a vehicle (that is, a host vehicle) on which the vehicle system 801 is mounted and at least one moving object existing in the vicinity of the host vehicle. Hereinafter, the moving object existing around the host vehicle will be referred to as a peripheral moving object. Examples of peripheral moving objects are the above-mentioned peripheral vehicles and pedestrians. The behavior prediction unit 828 predicts the behavior of the moving object to be predicted for a predetermined fixed time. The fixed time is, for example, a time equal to or slightly longer than the time required to travel on the candidate route. The behavior of the predicted target moving object is expressed including the elapsed time from the present time and the position at that time. The elapsed time expressing the behavior of the predicted target moving object takes a discrete value with the unit elapsed time as one unit. The unit elapsed time is several milliseconds to several tens of milliseconds, depending on the processing capacity of the device.

The behavior prediction unit 828 acquires the recognition result of the travel environment recognition unit 824 in order to predict the behavior of the moving object to be predicted. The recognition result of the travel environment recognition unit 824 includes the behavior of a peripheral vehicle, the behavior of a moving object existing around the host vehicle other than the peripheral vehicle, and the non-moving obstacle around the host vehicle.

Further, the behavior prediction unit 828 acquires the potential occurrence probability, which is an example of an index showing the potential possibility that the vehicle and the obstacle are close to each other, from the probability calculation unit 25. Then, the behavior prediction unit 828 predicts the behavior of the predicted target moving object in consideration of this potential occurrence probability. For example, with respect to the host vehicle, which is the predicted target moving object, it is predicted that the higher the potential occurrence probability, the more the speed will be limited. Further, the host vehicle may be predicted to increase the inter-vehicle distance as the potential occurrence probability increases.

In addition, the behavior prediction unit 828 can also predict the behavior of the moving object to be predicted with a probability distribution. An example of the probability distribution is the probability distribution of the position where the predicted target moving object exists at each time when the behavior of the predicted target moving object is predicted. Then, the behavior of the predicted target moving object may be predicted with a wider probability distribution as the potential probability of occurrence is higher.

Even when the moving object to be predicted is a peripheral vehicle, it may be predicted that the higher the potential occurrence probability is, the more the speed is limited, the inter-vehicle distance is lengthened, and the probability distribution is widened, as in the case of the host vehicle.

Further, in the present embodiment, the behavior prediction unit 828 also acquires the route calculated by the travel planning unit 27 as a short-term travel plan. In the following embodiment, the route calculated by the travel planning unit 27 as a short-term travel plan is used as a candidate route. The reason for selecting a "candidate" route is that the route calculated as a short-term travel plan is a candidate for a route used for automatic driving, and may not be used for automatic driving depending on the determination result of the responsibility determination unit 830. The candidate route is expressed including the time when the vehicle passes each position on the route in addition to the position where the vehicle travels. This is because even if the position is the same, if the time is different, the distance to the peripheral moving object is different. Therefore, even if the position is the same, if the time is different, the possibility of an accident is different.

As an example of the behavior of the predicted target moving object predicted by the behavior prediction unit 828, the behavior predicted for the host vehicle will be described. First, based on the behavior of the host vehicle at the present time, the position of the host vehicle when the unit elapsed time has elapsed is predicted. After that, assuming that the vehicle control ECU 6 controls the behavior of the host vehicle so as to travel on the candidate route acquired from the travel planning unit 27, the behavior of the host vehicle is predicted. However, depending on the travel environment, such as the need to change to a route that avoids peripheral moving objects, it is also predicted whether or not the vehicle will be unable to travel on the candidate route, and the behavior of the vehicle will be predicted.

Peripheral vehicles are sequentially wirelessly transmitting the planned travel route on which the peripheral vehicles are to travel. When the planned travel route can be acquired via the communication module 7, the behavior of the peripheral vehicle is predicted based on the fact that the peripheral vehicle is controlled so as to travel on the route. It is noted that the behavior of the peripheral vehicle is predicted by also determining whether the peripheral vehicle can travel on the planned route due to the obstacles existing around the peripheral vehicle.

In case of a predicted target moving object whose planned route cannot be acquired, for example a peripheral vehicle, a pedestrian, or the like whose planned route cannot be acquired, a behavior of such a predicted target moving object is predicted based on a traveling speed and a direction of movement of the predicted target moving object at the present time.

The scene determination unit 829 acquires the accident responsibility rule at the current vehicle position and each position on the candidate route. In other words, the scene determination unit 829 determines what kind of accident responsibility rule should be adopted at the current position of the host vehicle and each position on the candidate route.

Accident responsibility rules include location-specific accident responsibility rules and location-independent accident responsibility rules. An example of accident responsibility rules that differ depending on the location includes a priority relation on crossing roads. This priority relation is determined by the road shape or the road sign. Another example of accident responsibility rules that differ from place to place is the traffic rules that are set for each place. The traffic rules set for each place include, for example, the speed limit. Location-independent rules include, for example, the required inter-vehicle distance that depends on speed.

The scene determination unit 829 acquires the candidate route in order to acquire the accident responsibility rule that differs depending on the location at various points indicated by the candidate route. However, if the accident responsibility rule that differs depending on the location is acquired in consideration of the length of the candidate route, the scene determination unit 829 does not need to acquire the candidate route.

The responsibility determination unit 830 determines the responsibility of the host vehicle for a potential accident that is assumed when the host vehicle travels on the candidate route based on the behavior predicted by the behavior prediction unit 828. In order to make this determination, the responsibility determination unit 830 acquires the behavior of the predicted target moving object predicted by the behavior prediction unit 828, and also acquires the accident responsibility rule acquired by the scene determination unit 829 from the scene determination unit 829. Then, the behavior of the predicted target moving object predicted by the behavior prediction unit 828 is applied to the accident responsibility rule acquired by the scene determination unit 829. This determines the responsibility of the host vehicle for potential accidents that may occur if the host vehicle travels on the candidate route.

This responsibility is determined by whether or not the safety distance described in the first embodiment is secured between the host vehicle and the obstacle as one index. Therefore, the responsibility determination unit 830 is configured to include the confirmation unit 28 described in the first embodiment.

Responsibility for potential accidents can be expressed as a value (hereinafter referred to as potential accident responsibility value). If the potential accident responsibility value of the host vehicle is α %, the degree of responsibility of the peripheral moving objects assuming a potential accident with the host vehicle can also be expressed by a numerical value such as 100-α (%).

The potential accident responsibility value can be calculated from a preset formula such as a mathematical formula model disclosed in WO 2018/115963 A2. The disclosure of WO 2018/115963 A2 is incorporated herein by reference. In addition, the potential accident responsibility value can be determined using a map in which the potential accident responsibility value is determined from (i) the behavior of the host vehicle and peripheral moving objects predicted by the behavior prediction unit 828 and (ii) the accident responsibility rule. Further, the responsibility for the potential accident may not be expressed numerically, and only the presence or absence of the responsibility may be determined, or the potential accident responsibility value may be compared with the threshold value to determine the presence or absence of the responsibility as a result.

Suppose a case where the responsibility determination unit 830 determines that the responsibility for a potential accident on a candidate route does not arise on the host vehicle even if the host vehicle travels on the candidate route. In such a case, the automatic driving function unit 29 is instructed to use the candidate route as a route on which the host vehicle travels. When the travel planning unit 27 outputs only one candidate route, and the responsibility determination unit 830 determines that the vehicle is responsible for a potential accident when the host vehicle travels on the candidate route, the travel planning unit 27 is instructed to recalculate the candidate route.

Further, when the travel planning unit 27 outputs a plurality of candidate routes as candidate routes to be traveled in the same time zone, the responsibility determination unit 830 determines the responsibility of the host vehicle for potential accidents for each of the plurality of candidate routes. When it is determined that the host vehicle is responsible for the potential accident for all of the plurality of candidate routes, the traveling planning unit 27 is instructed to recalculate the candidate route. If it is determined that the vehicle is not responsible for potential accidents for two or more candidate routes out of a plurality of candidate routes, one candidate route is selected based on a predetermined criterion. Then, the selected candidate route is output to the automatic driving function unit 29. As the predetermined criterion, various criteria such as a criterion that is most consistent with the medium- to long-term travel plan and a criterion that the speed change is the smallest can be set. This criterion can also be considered as a criterion for determining the priority of a plurality of candidate routes.

When the responsibility determination unit 830 determines that the host vehicle is responsible for a potential accident, it is possible to simply prohibit the travel along the candidate route to be determined, instead of instructing the travel planning unit 27 to recalculate the candidate route. When driving along the candidate route to be determined is prohibited, the travel planning unit 27 may select to recalculate the candidate route or switch to lower level manual driving without performing the recalculation in response to the prohibition of the candidate route.

The storage medium 840 is writable and non-volatile, and can output the stored contents to an external device connected to the automatic driving device 802. Further, the storage medium 840 itself may be removable from the automatic driving device 802 so that it can be attached to an external device. The storage medium 840 is, for example, a flash memory.

The storage medium 840 stores the behavior of the predicted target moving object predicted by the behavior prediction unit 828. The behavior of the predicted target moving object predicted by the behavior prediction unit 828 may be stored in the storage medium 840. Thereby, it is possible to later verify whether or not the behavior prediction unit 828 can correctly predict the behavior of the predicted target moving object.

It is preferable that the storage medium 840 stores the behavior of the predicted target moving object predicted by the behavior prediction unit 828 as well as the candidate route calculated by the travel planning unit 27. In this way, the validity of the behavior of the predicted target moving object predicted by the behavior prediction unit 828 can be verified in consideration of the candidate route.

Further, it is preferable that one or more of the following is stored in the storage medium 840. One is the time associated with the candidate route or the behavior of the predicted target moving object predicted by the behavior prediction unit 828. The other one is the determination result of the responsibility determination unit 830. In addition, one or more of the behavior recognized by the travel environment recognition unit 824, the detection value of the behavior detection sensor 805, and the accident responsibility rule acquired by the scene determination unit 829 may be stored in the storage medium 840.

Brief of Eighth Embodiment

The vehicle system 801 of the eighth embodiment includes a responsibility determination unit 830 for determining responsibility for a potential accident when the host vehicle travels on a candidate route. Therefore, it can be determined in advance whether the host vehicle is responsible for the accident if the host vehicle travels on the candidate route and an accident occurs. Suppose a case where the host vehicle is caused to travel the candidate route under the automatic driving the level of which is determined to take responsibility for the accident by the automatic driving device 802. In such a case, it is possible to determine in advance whether or not the automatic driving device 802 will be liable for the accident.

In addition, the behavior prediction unit 828 included in the automatic driving device 802 acquires the potential occurrence probability, which is the probability of occurrence of the potential proximity between the host vehicle and the obstacle, which can be calculated from the environmental information. The behavior of the predicted target moving object is predicted in consideration of this potential occurrence probability. This improves the responsibility of the behavior prediction of the predicted target moving object. Further, by improving the responsibility of the behavior prediction of the predicted target moving object, the responsibility of the determination in the responsibility determination unit 830 is also improved.

Ninth Embodiment

Figure 9:
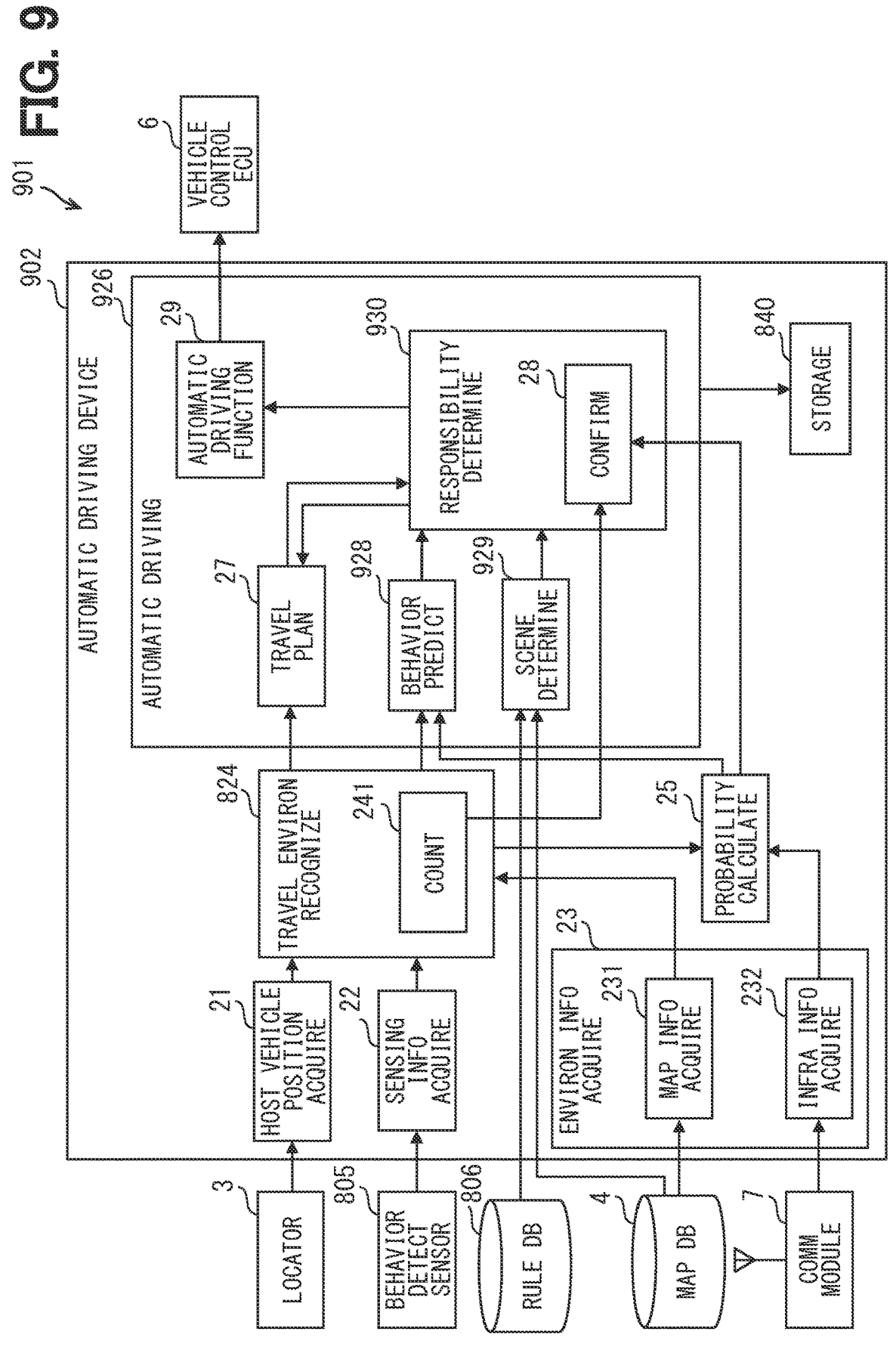
FIG. 9 is a block diagram of a vehicle system according to a ninth embodiment.

Next, a ninth embodiment will be described. FIG. 9 shows a configuration diagram of a vehicle system 901 of the ninth embodiment. The vehicle system 901 of the ninth embodiment is different from the automatic driving unit 826 of the eighth embodiment in the configuration of the automatic driving unit 926 among the configurations of the automatic driving device 902, which may also be referred to as an automatic driving controller 902.

The automatic driving unit 926 includes a travel planning unit 27, similar to the automatic driving unit 826 of the eighth embodiment. Further, the automatic driving unit 926 includes a behavior prediction unit 928, a scene determination unit 929, and a responsibility determination unit 930.

The travel planning unit 27 calculates a candidate route as in the travel planning unit 27 of the eighth embodiment. Note that, in the eighth embodiment, the candidate route is input to the behavior prediction unit 828 and the scene determination unit 829, whereas in the ninth embodiment, the candidate route is not input to the behavior prediction unit 928 or the scene determination unit 929, but is input to the responsibility determination unit 930.

The behavior prediction unit 928 acquires the travel environment recognized by the travel environment recognition unit 824, but predicts the behavior of the predicted target moving object without acquiring the candidate route. Therefore, the behavior of the predicted target moving object is predicted from the current behavior of the host vehicle, peripheral vehicles, and other moving objects. For example, for the host vehicle and peripheral vehicles, the future speed is predicted based on the current speed and acceleration, and the future direction of travel is predicted by maintaining the current steering angle. In addition to these, the altitude of the predicted target moving object is predicted in consideration of various travel environments recognized by the travel environment recognition unit 824. Examples of the behavior to be predicted in consideration of environmental information include: that it is predicted that the vehicle will stop or decelerate depending on the color of the signal; that it is predicted that the vehicle will slow down due to the presence of the vehicle in front; and that the direction of travel changes along the road that is curved. The time for the behavior prediction unit 928 to predict the behavior of the predicted target moving object is the same as the behavior prediction unit 828 of the eighth embodiment.

The scene determination unit 929 also acquires the travel environment recognized by the travel environment recognition unit 824, but does not acquire the candidate route. The scene determination unit 929 acquires the current host vehicle position and the accident responsibility rule around the current host vehicle position. The area around the position of the host vehicle includes a range in which the predicted target moving object can act according to the behavior of the predicted target moving object predicted by the behavior prediction unit 928.

The responsibility determination unit 930 acquires the candidate route calculated by the travel planning unit 27, the behavior of the predicted target moving object predicted by the behavior prediction unit 928, and the accident responsibility rule acquired by the scene determination unit 929. Then, the responsibility determination unit 930 refers to the behavior of the predicted target moving object predicted by the behavior prediction unit 928, and determines the behavior of the predicted target moving object including the host vehicle when the host vehicle travels on the candidate route. Furthermore, the determined behavior is applied to the accident responsibility rule acquired from the scene determination unit 929. This determines the responsibility of the host vehicle for potential accidents that may occur if the host vehicle travels on the candidate route.

Brief of Ninth Embodiment

In the ninth embodiment, the responsibility determination unit 930 acquires the candidate route, while the behavior prediction unit 928 predicts the behavior of the predicted target moving object without acquiring the candidate route. Even in this way, similarly to the responsibility determination unit 830 of the eighth embodiment, it is possible to determine the responsibility of the host vehicle for a potential accident assumed when the host vehicle travels on the candidate route.

In addition, with the configuration of the ninth embodiment, when an accident occurs and then verification becomes necessary for the accident, whether a candidate route involves a problem or a behavior predicted by the behavior prediction unit 928 is inaccurate can be easily verified.

Tenth Embodiment

In the first, eighth, and ninth embodiments, the configuration in which the automatic driving device 2 and the vehicle control ECU 6 are separate bodies is shown. However, it is not necessarily limited to this. For example, the automatic driving device 2 may have the function of the vehicle control ECU 6. Further, the automatic driving device 2 may have the function of the locator 3.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. The automatic driving devices 2, 802, 902 may be provided as controllers. The controllers and methods described in the present disclosure in the above embodiments may be implemented by one or more than one special-purpose computer. Such a computer may be created (i) by configuring (a) at least one memory and at least one processor programmed to execute one or more particular functions embodied in computer programs, or (ii) by configuring (b) at least one processor provided by one or more special purpose hardware logic circuits, or (iii) by configuring a combination of (a) at least one memory and at least one processor programmed to execute one or more particular functions embodied in computer programs and (b) at least one processor provided by one or more special purpose hardware logic circuits.

The computer program may be stored, as instructions to be executed by a computer, in a tangible non-transitory computer-readable storage medium.

For reference to further explain features of the present disclosure, the description is added as follows.

There is known an automatic driving that automates the driving operation of a vehicle. It is also considered to use a mathematical formula model that formulates the concept of safe driving for automatic driving.

For example, there is described a technology that maintains a safety distance at a minimum with an obstacle such a pedestrian. The safety distance is a distance as a criterion for evaluating safety, which is calculated by a mathematical formula model called an RSS (Responsibility Sensitive Safety) model in automatic driving. The above safety distance is determined based on information on behavior such as vehicle speed, maximum deceleration, and maximum acceleration.

In the above technology, the safety distance is determined based on the information on the behavior of the vehicle. The possibility of proximity to obstacles however changes depending on the peripheral environment other than the behavior of the vehicle, such as the places where pedestrians have an inclination to jump out.

It is thus desired for the present disclosure to provide a technology that reduces a danger that may occur during traveling of a vehicle.

Aspects of the present disclosure described herein are set forth in the following clauses.

According to a first aspect of the present disclosure, a vehicle control device is provided to be mounted on a vehicle including a travel planning unit for calculating at least one candidate route for the vehicle to travel. The vehicle control device includes a behavior prediction unit, a responsibility determination unit, and an environmental information acquisition unit. The behavior prediction unit is configured to predict a behavior of a predicted target moving object including the vehicle and at least one moving object around the vehicle. The responsibility determination unit is configured to determine a responsibility for a potential accident that is assumed in response to the vehicle traveling on the candidate route, based on the behavior predicted by the behavior prediction unit. The environmental information acquisition unit is configured to acquire environmental information that is information about an environment in which the vehicle is placed, the environment precluding an obstacle around the vehicle. Herein, the behavior prediction unit is further configured to estimate a possibility that a potential proximity of the vehicle to the obstacle occurs based on the environmental information acquired by the environmental information acquisition unit, and to predict the behavior of the predicted target moving object based on the estimated possibility.

According to a second aspect of the present disclosure, a computer-implemented vehicle control method is provided to be executed by a processor. The vehicle control method including (i) acquiring environmental information that is information about an environment in which a vehicle is placed, the environmental information precluding an obstacle around the vehicle; (ii) estimating a possibility of potential proximity of the vehicle to the obstacle; (iii) predicting a behavior of a predicted target moving object including the vehicle and at least one moving object around the vehicle based on the estimated possibility; and (iv) determining a responsibility for a potential accident that is assumed in response to the vehicle traveling a candidate route that is a candidate for a route that the vehicle travels, based on the predicted behavior of the predicted target moving object.

Thus, the above vehicle control device according to the first aspect and the vehicle control method according to the second aspect are each capable of determining the responsibility for potential accidents when the vehicle travels on a candidate route. Therefore, it can be determined in advance whether or not the vehicle be responsible for an accident potentially arising when the vehicle travels on a candidate route.

Further, the above vehicle control device and vehicle control method are configured to acquire the possibility of potential proximity of the vehicle to the obstacle which can be determined from the environmental information. Thereby, the behavior of the predicted target moving object may be predicted in consideration of the possibility. This improves the reliability of the behavior prediction of the predicted target moving object. Therefore, it becomes easy to reduce various dangers that may occur while the vehicle is running.

According to a third aspect of the present disclosure, an automatic driving device is provided to be used in a vehicle allowing an automatic driving. The automatic driving device includes an environmental information acquisition unit, a safety distance setting unit, and a safety distance adjusting unit. The environmental information acquisition unit is configured to acquire environmental information that is information about an environment in which the vehicle is placed. The safety distance setting unit is configured to set a safety distance using at least information of a behavior of the vehicle to secure a minimum distance that is required for the vehicle to have in between the vehicle and an obstacle in order to avoid a proximity of the vehicle to the obstacle. The safety distance adjusting unit is configured to increase the safety distance set by the safety distance setting unit setting unit as a potential occurrence probability increases. The potential occurrence probability is an occurrence probability of the proximity of the vehicle to the obstacle based on the environmental information acquired by the environmental information acquisition unit.

According to a fourth aspect of the present disclosure, a computer-implemented automatic driving method is provided to be executed by a processor to be used in a vehicle allowing an automatic driving. The automatic driving method includes: (i) acquiring environmental information that is information about an environment in which the vehicle is placed, the environmental information precluding an obstacle around the vehicle; and (ii) increasing a safety distance as a potential occurrence probability increases. Herein, the safety distance is set using at least information about a behavior of the vehicle to secure a minimum distance that is required for the vehicle to have in between the vehicle and the obstacle in order to avoid a proximity of the vehicle to the obstacle; the potential occurrence probability is an occurrence probability of the proximity of the vehicle to the obstacle based on the acquired environmental information.

Thus, the above automatic driving device according to the third aspect and the automatic driving method according to the fourth aspect are each capable of increasing a safety distance as a potential occurrence probability increases. The safety distance is set using at least information of a behavior of the vehicle to secure a minimum distance that is required for the vehicle to have in between the vehicle and the obstacle in order to avoid a proximity of the vehicle to the obstacle. The potential occurrence probability is an occurrence probability of the proximity of the vehicle to the obstacle based on the acquired environmental information. This potential occurrence probability is acquired based on environmental information. The safe distance is increased as the potential occurrence probability increases. This makes it possible to increase the safety distance as the possibility of proximity to an obstacle that changes depending on the peripheral environment other than the behavior of the vehicle increases. Then, even if the possibility of approaching an obstacle increases due to the peripheral environment other than the behavior of the vehicle, it becomes easier to avoid the approach to the obstacle by the amount of increasing the safety distance. As a result, it becomes possible to make it easier to avoid proximity to an obstacle during automatic driving of the vehicle.

What is claimed is:

1. A vehicle control device mounted on a vehicle including a travel planning unit for calculating a candidate route for the vehicle to travel, the vehicle control device comprising:

at least one memory storing computer program code; and at least one processor communicably coupled to the at least one memory; wherein the at least one memory is configured to, when the at least one processor executes the computer program code, cause the at least one processor to:

acquire environmental information that is information about an environment in which the vehicle is placed, the environment precluding an obstacle around the vehicle;

estimate a possibility that a potential proximity of the vehicle to the obstacle occurs based on the acquired environmental information;

predict a behavior of a predicted target moving object including the vehicle and at least one moving object around the vehicle based on the estimated possibility;

determine a responsibility of the vehicle for a potential accident on the candidate route based on the predicted behavior of the predicted target moving object; and control the vehicle based on the responsibility for the potential accident, wherein an accident responsibility rule is stored in a storage device, and the at least one memory further causes the at least one processor to:

determine the responsibility for the potential accident by applying the predicted behavior of the predicted target moving object to the accident responsibility rule stored in the storage device; and predict that the predicted target moving object will reduce speed when the potential proximity of the vehicle to the obstacle is likely to occur, and wherein the vehicle is provided with an automatic driving function unit that automatically controls a speed and a steering of the vehicle to drive the vehicle along a route, and in response to determining that the responsibility does not arise on the vehicle that is to travel the candidate route, the at least one memory is configured to further cause the at least one processor to instruct the automatic driving function unit to adopt the candidate route as a route that the vehicle travels.

2. The vehicle control device according to claim 1, wherein:

the at least one memory is configured to further cause the at least one processor to:

acquire the candidate route calculated by the travel planning unit; and predict the behavior of the predicted target moving object in response to a travel control device, which is provided in the vehicle, controlling the vehicle to travel the candidate route.

3. The vehicle control device according to claim 1, wherein:

the at least one memory is configured to further cause the at least one processor to:

predict the behavior of the predicted target moving object without acquiring the candidate route;

acquire (i) the candidate route from the travel planning unit and (ii) the behavior of the predicted target moving object; and determine the responsibility based on the acquired candidate route and the behavior of the predicted target moving object.

4. The vehicle control device according to claim 1, wherein:

the at least one memory is configured to further cause the at least one processor to:

in response to the travel planning unit calculating and outputting the candidate route by one alone, determine whether or not the responsibility arises on the vehicle that is to travel the candidate route that is calculated and output by one alone by the travel planning unit; and determine the candidate route output by one alone by the travel planning unit to be a route to be adopted in a vehicle control in response to determining that the responsibility does not arise on the vehicle; and instruct the travel planning unit to recalculate the candidate route in response to determining that the responsibility arises on the vehicle.

5. The vehicle control device according to claim 1, wherein:

the at least one memory is configured to further cause the at least one processor to:

in response to the travel planning unit calculating and outputting a plurality of the candidate routes, determine whether or not the responsibility arises on the vehicle that is to travel any one of the plurality of the candidate routes calculated and output by the travel planning unit; and in response to determining that the responsibility does not arise on the vehicle that is to travel several candidate routes among the plurality of the candidate routes calculated and output by the travel planning unit, designate one of the several candidate routes as a route to be adopted in a vehicle control based on a predetermined criterion.

6. The vehicle control device according to claim 1, wherein:

the travel planning unit is further configured to calculate the candidate route based on a route calculation algorithm including a neural network corresponding to a predetermined driving policy.

7. The vehicle control device according to claim 1, further comprising:

a storage medium configured to store the behavior of the predicted target moving object that is predicted.

8. The vehicle control device according to claim 7, wherein:

the storage medium is further configured to store the candidate route in addition to the behavior of the predicted target moving object.

9. The vehicle control device according to claim 1, wherein the at least one memory further causes the at least one processor to predict that the predicted target moving object will increase a distance to the vehicle when the potential proximity of the vehicle to the obstacle is likely to occur.

10. The vehicle control device according to claim 1, wherein the accident responsibility rule includes location-dependent rules and location-independent rules.

11. The vehicle control device according to claim 10, wherein the at least one memory is further configured to cause the at least one processor to acquire the location-dependent rules at a current position of the vehicle and along the candidate route from the storage device.

12. The vehicle control device according to claim 1, wherein the behavior of the predicted target moving object is expressed including an elapsed time from the present time and the position at that time.

13. A computer-implemented vehicle control method executed by a processor, the vehicle control method comprising:

acquiring environmental information that is information about an environment in which a vehicle is placed, the environmental information precluding an obstacle around the vehicle;

estimating a possibility of a potential proximity of the vehicle to the obstacle occurs based on the acquired environmental information;

predicting a behavior of a predicted target moving object including the vehicle and at least one moving object around the vehicle based on the estimated possibility;

determining a responsibility of the vehicle for a potential accident while traveling on a candidate route based on the predicted behavior of the predicted target moving object, wherein the responsibility for the potential accident is determined by applying the predicted behavior of the predicted target moving object to an accident responsibility rule, wherein the accident responsibility rule is stored in a storage device; and control the vehicle based on the responsibility for the potential accident, wherein the predicted target moving object is predicted to reduce speed when the potential proximity of the vehicle to the obstacle is likely to occur, and wherein the vehicle is provided with an automatic driving function unit that automatically controls a speed and a steering of the vehicle to drive the vehicle along a route, and in response to determining that the responsibility does not arise on the vehicle that is to travel the candidate route, the at least one memory is configured to further cause the at least one processor to instruct the automatic driving function unit to adopt the candidate route as a route that the vehicle travels.

14. The computer-implemented vehicle control method according to claim 13, wherein:

the environmental information includes information on how often a moving object appears on a road.

15. The computer-implemented vehicle control method according to claim 13, wherein the predicted target moving object is predicted to increase a distance to the vehicle when the potential proximity of the vehicle to the obstacle is likely to occur.

* * * * *